US010723410B2

(12) United States Patent
Voss

(10) Patent No.: US 10,723,410 B2
(45) Date of Patent: Jul. 28, 2020

(54) VEHICLE

(71) Applicant: Darrell W Voss, Chehalis, WA (US)

(72) Inventor: Darrell W Voss, Chehalis, WA (US)

( * ) Notice: Subject to any disclaimer, the term of this patent is extended or adjusted under 35 U.S.C. 154(b) by 298 days.

(21) Appl. No.: 15/898,645

(22) Filed: Feb. 18, 2018

(65) Prior Publication Data
US 2018/0273138 A1 Sep. 27, 2018

Related U.S. Application Data

(63) Continuation-in-part of application No. 15/796,053, filed on Oct. 27, 2017, which is a continuation-in-part
(Continued)

(51) Int. Cl.
*B60K 3/02* (2006.01)
*B62K 25/28* (2006.01)
(Continued)

(52) U.S. Cl.
CPC .............. *B62K 25/286* (2013.01); *B62J 1/08* (2013.01); *B62K 3/02* (2013.01); *B62K 25/283* (2013.01);
(Continued)

(58) Field of Classification Search
CPC ...... B62K 25/286; B62K 3/02; B62K 25/283; B62K 25/30; B62K 2025/044; B62J 1/08
See application file for complete search history.

(56) References Cited

U.S. PATENT DOCUMENTS

| 4,596,302 A | 6/1986 | Suzuki et al. |
| 4,821,833 A | 4/1989 | Yamaguchi |

(Continued)

FOREIGN PATENT DOCUMENTS

| FI | 20150329 A | 5/2017 |
| FR | 2898578 A1 | 9/2007 |

(Continued)

OTHER PUBLICATIONS

USPTO, Final Office Action for related U.S. Appl. No. 15/478,229, dated Apr. 12, 2019.
(Continued)

*Primary Examiner* — Jacob D Knutson
*Assistant Examiner* — Marlon A Arce
(74) *Attorney, Agent, or Firm* — Young's Patent Services; Bruce A. Young

(57) ABSTRACT

A vehicle, comprising: a forward frame portion; a rear frame portion; and a motion control system comprising a first motion control device that movably interconnects the forward frame portion and the rear frame portion and a second motion control device that movably interconnects the forward frame portion and the rear frame portion, wherein the first motion control device connects to the rear frame portion at a first location, and the second motion control device connects to the rear frame portion at a second location that is a fixed distance from the first location, and the motion control system, by virtue of a geometric arrangement of the motion control system relative to the forward frame portion and the rear frame portion, adopts, in response to a forward acceleration of the rear frame portion resulting from a driving force imparted by a wheel supported by the rear frame portion, an operating state in which forces imparted onto the motion control system by a tensioning of a drivetrain element that transfers driving energy from a driving axle supported by the forward frame portion to a driven axle supported by the rear frame portion, the forward acceleration of the rear frame portion, and an acceleration of a user mass supported by the forward frame portion are in equilibrium.

15 Claims, 4 Drawing Sheets

Related U.S. Application Data of application No. 15/478,229, filed on Apr. 3, 2017, now Pat. No. 10,457,349, and a continuation-in-part of application No. 15/468,106, filed on Mar. 23, 2017, now abandoned.

(51) Int. Cl.

| | | |
|---|---|---|
| B62J 1/08 | (2006.01) | |
| B62K 3/02 | (2006.01) | |
| B62K 25/30 | (2006.01) | |
| B62K 25/04 | (2006.01) | |

(52) U.S. Cl.
CPC ........ B62K 25/30 (2013.01); *B62K 2025/044* (2013.01)

(56) References Cited

U.S. PATENT DOCUMENTS

| | | |
|---|---|---|
| 5,000,470 A | 3/1991 | Kamler et al. |
| 5,207,619 A | 5/1993 | Klein et al. |
| 5,284,354 A | 2/1994 | McWethy |
| 5,360,088 A | 11/1994 | Voss |
| 5,364,115 A | 11/1994 | Klein et al. |
| 5,377,734 A | 1/1995 | Klein et al. |
| 5,385,361 A | 1/1995 | Bei |
| 5,405,159 A | 4/1995 | Klein et al. |
| 5,433,465 A | 7/1995 | Klein et al. |
| 5,452,911 A | 9/1995 | Klein et al. |
| 5,470,091 A | 11/1995 | Voss et al. |
| 5,499,864 A | 3/1996 | Klein et al. |
| 5,509,679 A | 4/1996 | Leitner |
| 5,517,878 A | 5/1996 | Klein et al. |
| 5,553,881 A | 9/1996 | Klassen et al. |
| 5,557,982 A | 9/1996 | Voss et al. |
| 5,586,780 A | 12/1996 | Klein et al. |
| 5,611,557 A | 3/1997 | Farris et al. |
| 5,626,355 A | 5/1997 | Voss et al. |
| 5,671,936 A | 9/1997 | Turner |
| 5,678,837 A | 10/1997 | Leitner |
| 5,692,764 A | 12/1997 | Klein et al. |
| 5,743,547 A | 4/1998 | Voss et al. |
| 5,762,352 A | 6/1998 | Lee |
| 5,772,228 A | 6/1998 | Owyang |
| 5,791,674 A | 8/1998 | D'Aluisio et al. |
| 5,826,899 A | 10/1998 | Klein et al. |
| 5,906,385 A | 5/1999 | Voss |
| 5,944,932 A | 8/1999 | Klein et al. |
| 5,988,741 A | 11/1999 | Voss et al. |
| 6,032,971 A | 3/2000 | Herder |
| 6,109,636 A | 8/2000 | Klein et al. |
| 6,170,845 B1 | 1/2001 | Tseng |
| 6,206,396 B1 | 3/2001 | Smith |
| 6,361,059 B1 | 3/2002 | Ellsworth |
| 6,609,722 B1 | 8/2003 | Miyoshi et al. |
| RE38,669 E | 12/2004 | Voss et al. |
| 6,848,700 B1 | 2/2005 | Fritschen |
| 7,048,292 B2 | 5/2006 | Weagle |
| 7,100,930 B2 | 9/2006 | Saiki |
| 7,128,329 B2 | 10/2006 | Weagle |
| 7,147,238 B2 | 12/2006 | Oi |
| 7,350,787 B2 | 4/2008 | Voss |
| 7,395,892 B2 | 7/2008 | Alonzo |
| 7,494,146 B2 | 2/2009 | Tseng |
| 7,556,276 B1 | 7/2009 | Dunlap |
| 7,566,066 B2 | 7/2009 | Chang et al. |
| 7,661,503 B2 | 2/2010 | Weagle |
| 7,717,212 B2 | 5/2010 | Weagle |
| 7,722,072 B2 | 5/2010 | Hoogendoorn |
| 7,815,207 B2 | 10/2010 | Currie |
| 7,828,314 B2 | 11/2010 | Weagle |
| 7,837,213 B2 | 11/2010 | Colegrove et al. |
| 8,066,297 B2 * | 11/2011 | Beale ................ B62K 25/286 |
| | | 280/284 |
| 8,272,658 B2 | 9/2012 | Hoogendoorn |
| 8,382,136 B2 | 2/2013 | Beale et al. |
| 8,622,411 B1 | 1/2014 | Chamberlain |
| 9,039,026 B2 | 5/2015 | Hudec |
| 9,242,693 B2 | 1/2016 | Voss |
| 9,988,122 B2 | 6/2018 | Pedretti |
| 2002/0180166 A1 | 12/2002 | Voss |
| 2003/0011167 A1 | 1/2003 | Turner |
| 2006/0063624 A1 | 3/2006 | Voss |
| 2006/0064223 A1 | 3/2006 | Voss |
| 2007/0063476 A1 | 3/2007 | Yu |
| 2008/0035431 A1 | 2/2008 | Vroomen et al. |
| 2008/0067772 A1 | 3/2008 | Weagle |
| 2008/0238030 A1 | 10/2008 | Tseng |
| 2008/0258517 A1 | 10/2008 | Julliard et al. |
| 2008/0272560 A1 | 11/2008 | Voss |
| 2009/0160156 A1 | 6/2009 | Yu |
| 2009/0315296 A1 | 12/2009 | Berthold |
| 2009/0322055 A1 | 12/2009 | Arraiz |
| 2010/0059965 A1 * | 3/2010 | Earle ................ B62K 25/26 |
| | | 280/284 |
| 2011/0233892 A1 | 9/2011 | Domahidy |
| 2012/0126506 A1 | 5/2012 | Zawistowski |
| 2013/0020782 A1 | 1/2013 | Hoogendoorn |
| 2014/0265208 A1 | 9/2014 | Voss |
| 2014/0265227 A1 | 9/2014 | Voss |
| 2015/0291244 A1 | 10/2015 | Hsu |
| 2016/0031521 A1 | 2/2016 | Voss |
| 2016/0083042 A1 | 3/2016 | Voss |
| 2016/0368559 A1 | 12/2016 | Voss |
| 2018/0265165 A1 * | 9/2018 | Zawistowski ........ B62K 25/286 |
| 2018/0304952 A1 | 10/2018 | Krugman et al. |
| 2018/0304958 A1 | 10/2018 | Madsen |
| 2020/0031426 A1 * | 1/2020 | Voss ................ B62K 19/02 |

FOREIGN PATENT DOCUMENTS

| | | |
|---|---|---|
| GB | 228382 A | 2/1925 |
| WO | 1995029838 A1 | 11/1995 |
| WO | 2001058748 A1 | 8/2001 |
| WO | 2012024697 | 3/2012 |
| WO | 2014152035 A3 | 12/2014 |
| WO | 2015134538 A1 | 9/2015 |

OTHER PUBLICATIONS

Young, Bruce, Response to Non-Final Office Action for related U.S. Appl. No. 14/956,274, dated Feb. 26, 2019.

KIPO, International Search Report for PCT/US2018/023462, dated Jul. 6, 2018.

KIPO, Written Opinion of the International Search Authority for PCT/US2018/023462, dated Jul. 6, 2018.

USPTO, Final Office Action for related U.S. Appl. No. 14/956,274, dated Jul. 5, 2018.

USPTO, Non-Final Office Action for related U.S. Appl. No. 14/956,274, dated Nov. 3, 2017.

USPTO, Non-Final Office Action for related U.S. Appl. No. 14/956,274, dated Dec. 17, 2018.

USPTO, Non-Final Office Action in related U.S. Appl. No. 15/478,229, dated Jun. 27, 2018.

Young, Bruce, Response to Final Office Action for related U.S. Appl. No. 14/956,274, dated Oct. 29, 2018.

Young, Bruce, Response to Non-Final Office Action for related U.S. Appl. No. 14/956,274, dated Mar. 5, 2018.

Young, Bruce, Response to Non-Final Office Action for related U.S. Appl. No. 15/478,229, dated Dec. 19, 2018.

USPTO, Non-Final Office Action for related U.S. Appl. No. 15/796,053, dated Apr. 18, 2019.

Cunningham, Richard, First Ride: Promising New Suspension Design From an Unlikely Source, Feb. 23, 2018, retrieved from https://www.pinkbike.com/news/first-ride-promising-new-suspension-design-from-an-unlikely-source.html, and https://www.pinkbike.com/u/RichardCunningham/album/Damon-Madsen/ on Feb. 26, 2018.

Cunningham, Richard, Polygon Square One EX9 and its R3ACT Suspension—Where it Came From and How it Works, Apr. 12, 2017, Retrieved from https://www.pinkbike.com/news/polygon-

(56) References Cited

OTHER PUBLICATIONS square-one-ex9-and-its-r3act-suspension-where-it-came-from-and-how-it-works-2017.html on Feb. 26, 2018.

David Arthur, Suspension stems are back pt2! ShockStop hits Kickstarter target with pivoting suspension stem, Road.CC, Sep. 10, 2015, Farrelly Atkinson Ltd., Bath, United Kingdom, Accessed on the Internet at: http://road.cc/content/news/163688-suspension-stems-are-back-pt2-shockstop-hits-kickstarter-target-pivoting on Aug. 29, 2016.

Rohde, Drew, Elevating More than Chainstays, Mar. 2017, Retrieved from http://www.bluetoad.com/publication/?=380382&ver=html5&p=90# on May 4, 2017.

Newman, Adam, Exclusive: Dirt Rag test rides new prototype from Chris Currie and Speedgoat Cycles, Dirtrag, Apr. 15, 2015, Retrieved from http://dirtragmag.com/exclusive-dirt-rag-test-rides-new-prototype-from-chris-currie-and-speedgoat-cycles/ on Mar. 4, 2018.

Matt Brett, Suspension stems are back!, Road.CC, Dec. 3, 2014, Farrelly Atkinson Ltd., Bath, United Kingdom, Accessed on the Internet at: http://road.cc/content/news/164555-naild-launches-r3act-suspension-stem-60mm-travel on Aug. 29, 2016.

USPTO, Notice of Allowance for related U.S. Appl. No. 15/796,053, dated Mar. 11, 2020.

\* cited by examiner

VEHICLE

CROSS-REFERENCE TO RELATED APPLICATIONS

This application claims priority to and benefit under 35 U.S.C. § 120 of the filing date of U.S. non-provisional Utility patent application Ser. No. 15/468,106, filed on Mar. 23, 2017 and priority to and benefit under 35 U.S.C. § 120 of the filing date of U.S. non-provisional Utility patent application Ser. No. 15/478,229, filed on Apr. 3, 2017 as well as priority to and benefit under 35 U.S.C. § 120 of the filing date of U.S. non-provisional Utility patent application Ser. No. 15/796,053, filed on Oct. 27, 2017, the entire disclosure of which applications is herein expressly incorporated by reference.

BACKGROUND OF THE DISCLOSURE

Field of the Disclosure

The present disclosure relates to vehicle, e.g. to a two-wheeled vehicle such as a bicycle.

Description of the Related Art

A large variety of vehicles are known to the prior art. The present disclosure expounds upon this background.

SUMMARY OF THE PRESENT DISCLOSURE

The aim of the present summary is to facilitate understanding of the present disclosure. The summary thus presents concepts and features of the present disclosure in a more simplified form and in looser terms than the detailed description below and should not be taken as limiting other portions of the present disclosure.

Loosely speaking, the present disclosure relates, inter alia, to a bike or e-bike that comprises a forward frame portion and a rear frame portion that are movably interconnected by a motion control system. The motion control system is configured such that, when the rear frame portion is accelerated, e.g. by a driving force of a rear wheel supported by the rear frame portion against the ambient terrain, the motion control system adopts a state of equilibrium by virtue of a geometric arrangement of the motion control system. In other words, the elements constituting the motion control system may be geometrically arranged such that the elements, in response to a forward acceleration of the rear frame portion, inherently move to an operating state in which forces imparted onto the motion control system by a tensioning of a drivetrain element that transfers driving energy from a driving axle supported by the forward frame portion to a driven axle supported by the rear frame portion,
the forward acceleration of the rear frame portion, and
an acceleration of a user mass supported by the forward frame portion are in equilibrium.

More specifically, the present disclosure teaches, inter alia, a vehicle, comprising: a forward frame portion; a rear frame portion; and a motion control system comprising a first motion control device that movably interconnects said forward frame portion and said rear frame portion and a second motion control device that movably interconnects said forward frame portion and said rear frame portion, wherein said first motion control device connects to said rear frame portion at a first location, and said second motion control device connects to said rear frame portion at a second location that is a fixed distance from said first location, and said motion control system, by virtue of a geometric arrangement of said motion control system relative to said forward frame portion and said rear frame portion, adopts, in response to a forward acceleration of said rear frame portion resulting from a driving force imparted by a wheel supported by said rear frame portion, an operating state in which forces imparted onto said motion control system by a tensioning of a drivetrain element that transfers driving energy from a driving axle supported by said forward frame portion to a driven axle supported by said rear frame portion, said forward acceleration of said rear frame portion, and an acceleration of a user mass supported by said forward frame portion are in equilibrium.

Other objects, advantages and embodiments of the present disclosure will become apparent from the detailed description below, especially when considered in conjunction with the accompanying drawings.

BRIEF DESCRIPTION OF THE DRAWINGS

The Figures show.

DETAILED DESCRIPTION

Figure 1A:
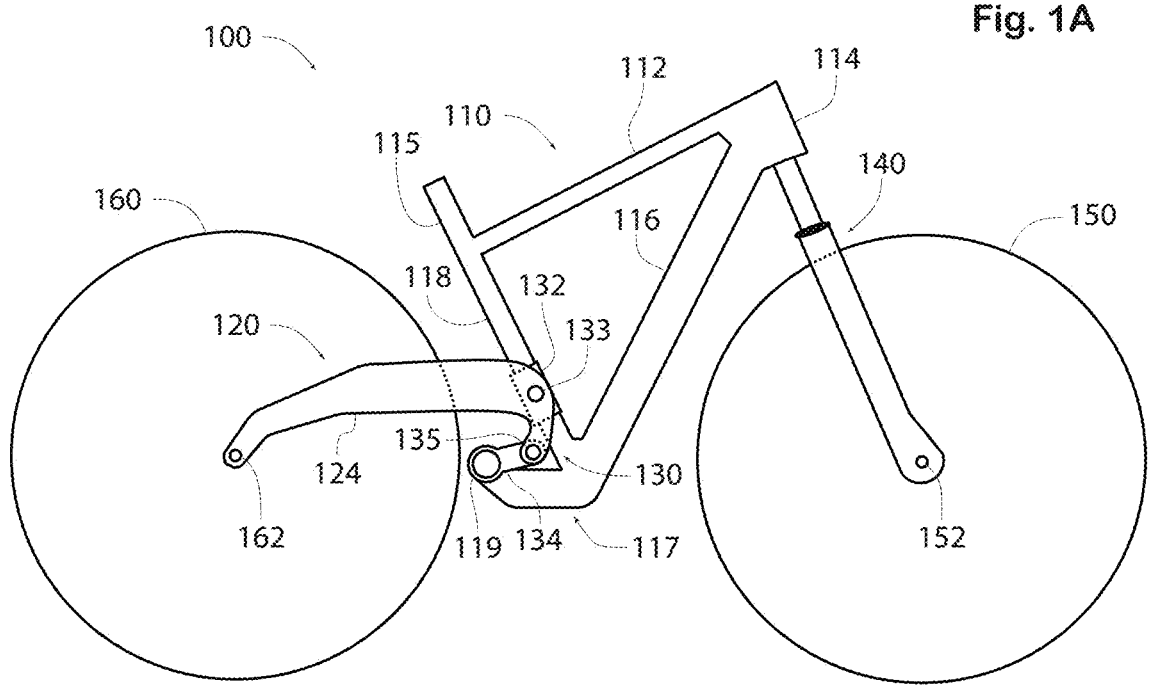
FIG. 1A a schematic depiction of a first exemplary embodiment of a vehicle in accordance with the present disclosure.

The various embodiments of the present disclosure and of the claimed invention, in terms of both structure and operation, will be best understood from the following detailed description, especially when considered in conjunction with the accompanying drawings.

Before elucidating the embodiments shown in the Figures, the various embodiments of the present disclosure will first be described in general terms.

The present disclosure relates to a vehicle. In the context of the present disclosure, a vehicle may be understood as a system (of interacting elements), which system transfers (at least part of) a gravitational force acting on a payload of a vehicle to at least one (propulsive) element that interacts with an ambient environment of the vehicle, e.g. for the sake of providing a propulsive force and/or for the sake of allowing the vehicle to glide/roll over an ambient surface. The payload may include a driver, a rider and/or a passenger of the vehicle. The payload may include an inanimate payload. The ambient surface may be terrain. Similarly, the ambient surface may be a water surface, e.g. a surface of a body of water. The (propulsive) element may be a terrain-engaging element, e.g. a terrain-engaging element selected from the group consisting of a wheel, a skid, a ski and a (continuous) track. Similarly, the (propulsive) element may be a marine (propulsion) element, e.g. an element selected from the group consisting of a float, a hull, a water ski, a jet nozzle and a propeller. For the sake of conciseness, the term "terrain-engaging element" will be used hereinafter to designate any (propulsive) element as described hereinabove, regardless of whether such element is a marine element. (An elucidation of the term "any" is given in the closing paragraphs of this specification.)

The vehicle may comprise at least one terrain-engaging element as described above. The vehicle may be a vehicle selected from the group consisting of a bicycle, an e-bike, a motorcycle, a moped, a (terrestrial) rover, a snowmobile, a snow scooter and a (personal) watercraft. As such, the vehicle may be a vehicle selected from the group consisting of a human-powered vehicle, a (gasoline and/or electric) motor-powered vehicle and a vehicle powered by both human and (gasoline and/or electric) motor power. Moreover, the vehicle may be a two-wheeled vehicle, e.g. a two-wheeled bike, a two-wheeled e-bike or a two-wheeled motorcycle. Similarly, the vehicle may be a three-wheeled vehicle, e.g. a tricycle, a three-wheeled e-bike or a three-wheeled motorcycle. In the context of the present disclosure, the term "e-bike" may be understood as a bicycle/tricycle comprising an electrically powered motor that contributes a driving force to at least one wheel of the bicycle. As touched upon above, the term "driving force" may be understood in the present disclosure as a propulsive force, e.g. a propulsive force that propels the vehicle relative to the ambient terrain.

As evidenced by the remarks above, the specialized nomenclature typically associated with the various vehicles to which the inventive principles of the present disclosure are applicable impairs both the conciseness and overall readability of the present disclosure. Accordingly, the remainder of this disclosure will, in general, use the nomenclature of a bicycle as a contextual basis for the disclosure. This use of bicycle nomenclature is not intended to exclude other types of vehicles from the scope of that disclosure. Instead, it is trusted that the reader can easily transfer the concepts disclosed herein in the context of a bicycle to other vehicles without inventive skills. Accordingly, the following disclosure will also include occasional references to other types of vehicles to aid the read in understanding how the disclosed teachings may be applied to vehicles other than bicycles.

The vehicle may comprise a first frame portion and a second frame portion. The first frame portion may define a first rotational axis, e.g. a rotational axis of a driving sprocket (as opposed to a driven sprocket). For example, the first rotational axis may be a rotational axis of a bottom bracket. Similarly, the first frame portion may comprise a drivetrain axle support (that defines the first rotational axis). For example, the first frame portion may comprise a bottom bracket and/or a bottom bracket shell (that constitutes the drivetrain axle support). Similarly, the vehicle may comprise a driving axle, e.g. an axle of a bottom bracket. The driving axle may constitute a rotational axle of a driving sprocket and may be supported by the drivetrain axle support. A rotational axis of the driving axle may coincide with the first rotational axis. The first rotational axis/drivetrain axle support may be located in a lower portion of the first frame portion, e.g. in a lowermost 30%, a lowermost 20%, a lowermost 10% or a lowermost 5% of the first frame portion. (The terms "lower" and "lowermost" are described in further detail infra.) Similarly, the first rotational axis/drivetrain axle support may be located in a rearward region of the first frame portion, e.g. in a most rearward 30%, a most rearward 20%, a most rearward 10% or a most rearward 5% of (the aforementioned lower(most) portion of) the first frame portion. (The term "rearward" is described in further detail infra.) Such a lower portion and/or rearward region may constitute a bottom bracket region. Similarly, the second frame portion may define a second rotational axis, e.g. a rotational axis of a driven sprocket. For example, the second rotational axis may be a rotational axis of a (second/rear) wheel. Similarly, the second rotational axis may be a (rearmost) rotational axis of a guide of a (continuous) track. The vehicle may comprise a driven axle, e.g. an axle of a driven sprocket and/or an axle of a (second/rear) wheel. A rotational axis of the driven axle may coincide with the second rotational axis. The second rotational axis may be located in a rearward region of the second frame portion, e.g. in a most rearward 30%, a most rearward 20%, a most rearward 10% or a most rearward 5% of the second frame portion. Similarly, the second rotational axis may be located in a lower region of the second frame portion, e.g. in a lowermost 30%, a lowermost 20%, a lowermost 10% or a lowermost 5% of (the aforementioned (most) rearward region of) the second frame portion. The first frame portion and/or the second frame portion may comprise at least one (steel, aluminum and/or carbon fiber) tube and/or at least one (steel, aluminum and/or carbon fiber) beam. As such, at least 80%, at least 90% or (substantially) an entirety of the first/second frame portion (by volume and/or by weight) may be a material selected from the group consisting of steel, aluminum and carbon fiber. For example, an entirety of the first/second frame portion may be of such a material except bushings and/or thread elements, e.g. for interconnecting the first/second frame portion with other structures of the vehicle. Such bushings and/or thread elements may demand wear characteristics and/or machining tolerances not achievable with aluminum or carbon fiber.

The first frame portion may constitute a more forward portion of the vehicle than the second frame portion. As such, the first frame portion may be termed a "forward frame portion". Similarly, the second frame portion may be termed a "rear frame portion" or a "rearward frame portion". In the present disclosure, "forward" and/or "rear" (as well as related terms such as fore, aft, front and back) may be defined, as known in the art, by an orientation and/or location of a steering wheel and/or handlebars and/or an orientation and/or location of seats (of the vehicle) relative to the vehicle (as a whole). Similarly, "forward" and/or "rear" (and related terms) may be defined, as known in the art, by (other) characteristics of the vehicle. Such characteristics may include a shape of a chassis, a configuration of a drivetrain, etc. For example, the seat may be "forward" of a propulsive terrain-engaging element. A (dominant) direction of propulsion and/or motion of the vehicle may be a "forward" direction. (For the sake of conciseness, the term "propulsion direction" will be used hereinafter to designate the (dominant) direction of the vehicle regardless of whether the vehicle comprises a motor or other means of propulsion). In the present disclosure, "forward" and/or "rear" (and related terms) may designate a (relative) location with respect a "horizontal" axis (when the vehicle is on level terrain). Such designation may be independent of a "vertical" location, i.e. is not to be invariably construed as implying a "vertical" location.

In the present disclosure, "upward" and/or "downward" (as well as related terms such as above, below, upper, higher and lower) may be defined, as known in the art, by an orientation and/or location of seats (of the vehicle) relative to the vehicle (as a whole) and/or a location of a steering wheel and/or handlebars relative to a seat (of the vehicle). Similarly, "upward" and/or "downward" (and related terms) may be defined, as known in the art, by (other) characteristics of the vehicle. Such characteristics may include a shape of a chassis, a configuration of a drivetrain, a location of at least one terrain-engaging element as described above, etc. In the present disclosure, "upward" and/or "downward" (and related terms) may designate a (relative) location with respect a "vertical" axis (when the vehicle is on level terrain). Such designation may be independent of a "horizontal" location, i.e. is not to be invariably construed as implying a "horizontal" location.

In the nomenclature of a bicycle, the first frame portion may comprise a seat tube, a top tube, a head tube and a down tube. The first frame portion may have the shape of a quadrilateral. The seat tube, top tube, head tube and down tube may constitute the four sides of the quadrilateral. The seat tube may rigidly connect the top tube and the down tube. Similarly, the seat tube need not rigidly connect the top tube and the down tube. For example, the seat tube may comprise at least one of an upper seat tube portion and a lower seat tube portion. The upper seat tube portion may be (rigidly) connected to the top tube. The lower seat tube portion may be (rigidly) connected to at least one of (a lower region of) the down tube and the drivetrain axle support. In the case of both an upper seat tube portion and a lower seat tube portion, the upper seat tube portion may lack a direct connection to the lower seat tube portion. As such, the first frame portion may have the shape of a partial quadrilateral. The top tube, head tube and down tube may constitute three sides of the partial quadrilateral and at least one of the upper/lower seat tube portion may constitute a fourth side of the partial quadrilateral. In such a configuration, the top tube, head tube and down tube may (collectively) act as a spring. (For the sake of readability, the term "seat tube" will be used to designate any of the seat tube, the upper seat tube portion and the lower seat tube portion.)

The first frame portion may furthermore comprise a front fork, a steering tube of the front fork being rotatably mounted in the head tube. The first frame portion may comprise a bottom bracket and/or a bottom bracket shell. The bottom bracket (shell) may be located in and/or supported by the bottom bracket region (e.g. as defined supra). The bottom bracket (shell) may be located proximate to and/or rearward of a(n imaginary) junction of the down tube and the seat tube. The first frame portion may comprise comprises a top tube, a bottom bracket region (e.g. as defined supra) and a seat tube that rigidly connects the top tube and the bottom bracket region.

The vehicle may comprise at least one seat, e.g. for at least one user selected from the group consisting of a driver, a rider and a passenger of the vehicle. The seat may be mounted on/rigidly connected to the first frame portion. The seat may lack connection to the second frame portion except via the first frame portion. The seat may be connected to the first frame portion via the seat tube. For example, the seat may be fastened to a seat post. A portion of the seat post may extend inside (and be clamped by) the seat tube.

The first frame portion may comprise a seat support portion. The seat support portion may be located in an upper region of the first frame portion, e.g. in an uppermost 30%, an uppermost 20% or an uppermost 10% of the first frame portion. The seat support portion may be located in rearward region of the first frame portion, e.g. in a most rearward 30%, a most rearward 20%, a most rearward 10% or a most rearward 5% of the first frame portion. The seat support portion may be located at/proximate to an intersection of the seat tube and the top tube. Similarly, the seat support portion may be located at/proximate to an intersection of the upper seat tube portion and the top tube. The seat support portion may support the seat directly. As such, the seat may be mounted on/rigidly connected to the seat support portion. Similarly, the seat support portion may support the seat indirectly. For example, the seat may be mounted on/rigidly connected to a seat post that is mounted/rigidly connected to the seat support portion. A portion of the seat tube, e.g. the upper seat tube portion, may constitute the seat support portion.

The lower seat tube portion may extend from a lower and/or rearward region of the first frame portion in a (general) direction of the seat support portion. For example, the lower seat tube may extend from a lowermost and/or most rearward 30%, a lowermost and/or most rearward 20%, a lowermost and/or most rearward 10% or a lowermost and/or most rearward 5% of the first frame portion. Similarly, the upper seat tube portion may extend from an upper and/or rearward region of the first frame portion in a (general) direction (of a lower region) of the down tube and/or the drivetrain axle support. For example, the upper seat tube may extend from an uppermost and/or most rearward 30%, an uppermost and/or most rearward 20%, an uppermost and/or most rearward 10% or an uppermost and/or most rearward 5% of the first frame portion. The upper seat tube may extend in a direction of a lowermost 30%, a lowermost 20%, a lowermost 10%, or a lowermost 5% of the down tube.

The second frame portion may comprise/consist (substantially) of a (rear) fork, e.g. a (rear) fork that supports a (rear) wheel of the vehicle. The fork may comprise/consist (substantially) of a first arm, a second arm and a yoke portion. Each of the first and second arms may comprise a dropout, opening or bore (in a rearmost 10% of the respective arm) that receives a (respective) end of an axle (of the wheel). The first and second arms, e.g. the dropouts, openings or bores thereof, may define (a position of) the second rotational axis. The yoke portion may interconnect the first and second arms (at a (respective) forward portion of each of the first and second arms). The fork may comprise a space between the first and second arms that accommodates a (forward) portion of the (rear) wheel (as known in the art). The fork may be a monolithic/unitary structure. The fork may be termed a "swingarm". The fork may constitute an elevated chain stay.

The vehicle may comprise a (power conversion) mechanism for converting (leg and/or arm) motion of a user/rider into mechanical power. The mechanism may comprise a (driving) sprocket. The mechanism may comprise a crankset (that comprises the sprocket) and/or (pivotally mounted) levers (that drive the sprocket). The mechanism may be mounted on the first frame portion, e.g. via the bottom bracket.

The vehicle may comprise a drivetrain, e.g. for transmitting a driving force from the (power conversion) mechanism/the (driving) sprocket to (a driven sprocket connected to) at least one terrain-engaging element (mounted on the second frame portion) of the vehicle. For example, the drivetrain may transfer driving energy from a driving axle supported by the first frame portion to a driven axle supported by the second frame portion. The drivetrain may comprise a chain and/or a belt. The drivetrain may transfer driving energy from the driving axle to the driven axle by a tensioning of a drivetrain element, e.g. a tensioning of the chain/belt.

The vehicle may comprise a (gasoline and/or electric) motor. The motor may be located in a lower and/or rearward portion of the first frame portion as described supra. The motor may contribute a driving force to at least one terrain-engaging element of the vehicle, e.g. via the drivetrain. The motor may be mounted on the first frame portion. The drivetrain may transmit a driving force from the motor (mounted on the first frame portion) to (a driven sprocket connected to) at least one terrain-engaging element (mounted on the second frame portion) of the vehicle. Similarly, the motor may be mounted on the second frame portion and provide a driving force to at least one terrain-engaging element mounted on the second frame portion.

The vehicle may comprise a motion control system, e.g. a motion control system that movably interconnects the first frame portion and the second frame portion. As such, the motion control system may connect the first frame portion and the second frame portion such that the first frame portion is movable (within a limited range of motion defined by the motion control system) relative to the second frame portion (and vice versa).

Motion of the motion control system may be constrained to a limited range, e.g. by virtue of the construction of the motion control system and/or interaction of the motion control system with at least one of the first frame portion and the second frame portion. For example, the motion control system may be movable between a first end-of-range position/operating state and a second end-of-range position/operating state. More specifically, motion of the motion control system may be constrained between a first end-of-range position/operating state and a second end-of-range position/operating state. As such, the motion control system may be constrained to (a plurality of) operating states intermediate a first end-of-range operating state and a second end-of-range operating state. (Although the present specification often uses the term "operating state" to emphasize that the motion control system is a dynamic system, the term "state" may be used in lieu of the term "operating state".)

More specifically, motion of the motion control system may be constrained such that (at least one portion of) at least one component of the motion control system moves (along a linear or curved path) between a (respective) first end-of-range position (when the motion control system is in the first end-of-range position/operating state) and a (respective) second end-of-range position (when the motion control system is in the second end-of-range position/operating state). Moreover, motion of the motion control system may be constrained such that (at least one portion of) at least one component of the motion control system moves (exclusively) along a (respective) path relative to at least one of the first frame portion and the second frame portion. For example, a connection point of the motion control system to the second frame portion may (be constrained to) move (exclusively) along a linear or curved path relative to the first frame portion. Similarly, a connection point of the motion control system to the first frame portion may (be constrained to) move (exclusively) along a linear or curved path relative to the second frame portion. The path traveled by the (at least one portion of) at least one component of the motion control system (relative to at least one of the first frame portion and the second frame portion) as the (at least one portion of) at least one component of the motion control system transitions from the (respective) first end-of-range position to the (respective) second end-of-range position may be identical to the path traveled by the (at least one portion of) at least one component of the motion control system (relative to at least one of the first frame portion and the second frame portion) as the (at least one portion of) at least one component of the motion control system transitions from the (respective) second end-of-range position to the (respective) first end-of-range position.

An operating state in which (at least one portion of) at least one component of the motion control system is halfway between a (respective) first end-of-range position and a (respective) second end-of-range position may constitute/be designated as a mid-range position (of the motion control system), where "halfway" may be determined e.g. as a function of an angle between any two components of the motion control system, as a function of an angle between any component of the motion control system and a portion of the first/second frame portion, and/or as a function of a distance along a (linear/curved) path of motion of (the) (at least one portion of) at least one component of the motion control system. For example, an operating state in which (at least one portion of) at least one component of the motion control system is (linearly/angularly) halfway along a linear/curved path between a (respective) first end-of-range position and a (respective) second end-of-range position may constitute/be designated as a mid-range position (of the motion control system).

The motion control system may (be configured and arranged to) adopt an equilibrium state, i.e. an operating state in which (at least two/all) forces acting on/imparted onto the motion control system are in equilibrium, e.g. the forces imparted onto the motion control system (exclusively) by a tensioning of a drivetrain element (e.g. a chain or belt) that transfers driving energy from (a driving axle supported by) the first frame portion to (a driven axle supported by) the second frame portion, a forward acceleration of the second frame portion, and an acceleration of a user mass supported by (the seat support portion of) the first frame portion.

The motion control system may adopt the equilibrium state in response to the forward acceleration of the second frame portion, e.g. in response to the forces effecting and resulting from such acceleration. For example, (the motion control system may be configured and arranged such that) the forces imparted onto the motion control system (may) act on (at least one component of) the motion control system in a manner that moves the motion control system into the equilibrium state (if not already in the equilibrium state). The forward acceleration of the second frame portion may be a forward acceleration resulting from a driving force imparted by terrain-engaging element, e.g. a wheel, supported by the second frame portion.

The motion control system may adopt the equilibrium state by virtue of a geometric arrangement of (the components constituting the) motion control system relative to the forward frame portion and the rear frame portion. For example, the motion control system may be geometrically configured and arranged (relative to the forward frame portion and the rear frame portion) such that the forces imparted onto the motion control system act on (at least one component of) the motion control system in a manner that moves the motion control system into the equilibrium state (if not already in the equilibrium state).

The (components constituting the) motion control system may be (geometrically) configured and arranged (relative to the forward frame portion and the rear frame portion) such that a range of motion of the motion control system is constrained in such a fashion that the motion control system, in response to the (driven) forward acceleration of the second frame portion (e.g. in response to the forces effecting and resulting from such acceleration), will move toward the equilibrium state (until in the equilibrium state).

The tensioning of a drivetrain element may impart a force onto the motion control system (that urges/moves the motion control system) in a direction of a third position/operating state. The drivetrain element may be a drivetrain element (e.g. a chain or belt) that transfers driving energy from (a driving axle supported by) the first frame portion to (a driven axle supported by) the second frame portion. The third position/operating state may differ from at least one of the first end-of-range position/operating state and the second end-of-range position/operating state. The (instantaneous) magnitude of the force imparted onto the motion control system (in a direction of the third position/operating state) by the tensioning of the drivetrain element may depend on the (instantaneous) magnitude of the tensioning force effecting the tensioning of the drivetrain element. Similarly, the (instantaneous) magnitude of the force imparted onto the motion control system (in a direction of the third position/operating state) by the tensioning of the drivetrain element may depend on the (instantaneous) operating state of the motion control system. The (instantaneous) magnitude of the force imparted onto the motion control system (in a direction of the third position/operating state) by the tensioning of the drivetrain element as a function of the (instantaneous) operating state of the motion control system may exhibit a minimum, e.g. zero, at the third position/operating state. More specifically, the (components constituting the) motion control system may be (geometrically) configured and arranged such that the (instantaneous) magnitude of the force imparted onto the motion control system (in a direction of the third position/operating state) by the tensioning of the drivetrain element as a function of the (instantaneous) operating state of the motion control system exhibits a minimum, e.g. zero, at the third position/operating state (that is different from at least one of the first end-of-range position/operating state and the second end-of-range position/operating state). In an operating state of the motion control system between the second end-of-range position/operating state and the third position/operating state, a tensioning of the drivetrain element may impart a force onto the motion control system that urges the motion control system toward the first end-of-range position/operating state. In an operating state of the motion control system between the first end-of-range position/operating state and the third position/operating state, a tensioning of the drivetrain element may impart a force onto the motion control system that urges the motion control system toward the second end-of-range position/operating state.

The acceleration of the user mass supported by (the seat support portion of) the first frame portion may impart a force onto the motion control system (that urges/moves the motion control system) in a direction of the second end-of-range position/operating state. The (instantaneous) magnitude of the force imparted onto the motion control system (in a direction of the second end-of-range position/operating state) by the acceleration of the user mass may depend on the (instantaneous) magnitude of the acceleration of the user mass. Similarly, the (instantaneous) magnitude of the force imparted onto the motion control system (in a direction of the second end-of-range position/operating state) by the acceleration of the user mass may depend on the (instantaneous) operating state of the motion control system.

The forward acceleration of the second frame portion (e.g. resulting from a driving force imparted by terrain-engaging element supported by the second frame portion) may likewise impart a force onto the motion control system (that urges/moves the motion control system) in a direction of the second end-of-range position/operating state. The (instantaneous) magnitude of the force imparted onto the motion control system (in a direction of the second end-of-range position/operating state) by the forward acceleration of the second frame portion may depend on the (instantaneous) magnitude of the acceleration of the user mass. Similarly, the (instantaneous) magnitude of the force imparted onto the motion control system (in a direction of the second end-of-range position/operating state) by the forward acceleration of the second frame portion may depend on the (instantaneous) operating state of the motion control system.

The (components constituting the) motion control system may be (geometrically) configured and arranged (relative to the first frame portion and the second frame portion) such that, in an equilibrium position/operating state (that differs from at least one of the first end-of-range position/operating state and the second end-of-range position/operating state), the sum of the (aforementioned) forces urging/moving the motion control system in a direction of the first end-of-range position/operating state (e.g. as a result of the tensioning of the drivetrain element) and the (aforementioned) forces urging/moving the motion control system in a direction of the second end-of-range position/operating state (e.g. as a result of the forward acceleration of the second frame portion and/or the user mass acceleration) are in equilibrium.

The motion control system may be (mechanically) self-stabilizing. The motion control system may be self-stabilizing in the sense that the motion control system, in response to (a respective totality of) forces (momentarily) exerted onto the motion control system (via the first and/or second frame portions) e.g. by a user, the ambient terrain of the vehicle and/or gravity, is capable of adopting/adopts a respective (stable) operating state (without the aid of (any) other systems/without the aid of an energy management device such as a spring and/or fluid-based shock absorber). The statement that the motion control system is capable of adopting/adopts a respective (stable) operating state without the aid of (any) other systems does not preclude the presence of any such other system. Instead, that statement simply emphasizes the ability of the motion control system to adopt such a respective (stable) operating state without the aid of (any) other systems, regardless of whether such other system is present/such aid occurs. The respective (stable) operating state may differ from at least one of the first end-of-range operating state and the second end-of-range operating state. The respective (stable) operating state may be stable in the sense that the forces imparted onto the motion control system by 1) a tensioning of a drivetrain element (that transfers driving energy from a driving axle supported by the first frame portion to a driven axle supported by the second frame portion), 2) a forward acceleration of the second frame portion, and 3) an acceleration of a user mass supported by the first frame portion are in equilibrium. The self-stabilization of the motion control system may be mechanical in the sense that the motion control system (passively) adopts the respective (stable) operating state by virtue of the mechanical kinematics of the motion control system.

The motion control system may (be configured and arranged to) impart, in response to a forward acceleration of the second frame portion, a force onto the first frame portion that (immediately) accelerates the seat support portion in a forward direction. Moreover, the motion control system may (be configured and arranged to) impart, in response to a forward acceleration of the second frame portion, a force onto the first frame portion that (immediately) accelerates the seat support portion in a forward direction at an acceleration no less than an acceleration of a drivetrain axle support (of the first frame portion) in the forward direction. As such, the motion control system may impart the force such that acceleration of the seat support portion does not lag behind/is not less than acceleration of the drivetrain axle support, e.g. the bottom bracket (shell). The motion control system may (be configured and arranged to) impart, in response to a forward acceleration of the second frame portion, a force onto the first frame portion that (immediately) accelerates the seat support portion in (both a forward and) an upward direction. The forward acceleration of the second frame portion may be a forward acceleration resulting from a (terrain-engaging) driving force imparted by a wheel supported by the second frame portion. The acceleration of the seat support portion may be "immediate" in the sense that the forward acceleration of the second frame portion and the acceleration of the seat support portion commence (essentially) simultaneously (aside from a time lag attributable to machining tolerances/(designed) fitting tolerances of components that (must) interact to impart the force onto the first frame portion and/or to convert forces of the forward acceleration of the second frame portion into the force onto the first frame portion). The acceleration of the seat support portion may be "immediate" in the sense that the motion control system, in response to the forward acceleration of the second frame portion, need not move (relative to the first/second frame portion) to impart the force onto the first frame portion that accelerates the seat support portion (in the forward/upward direction). Moreover, the acceleration of the seat support portion may be "immediate" in the sense that the forward acceleration of the second frame portion will induce a motion (of components) of the motion control system (relative to the first/second frame portion), which motion imparts the force onto the first frame portion, the forward acceleration of the second frame portion, the motion (of components) of the motion control system and the acceleration of the seat support portion commencing (essentially) simultaneously (aside from a time lag attributable to machining tolerances/(designed) fitting tolerances of components that (must) interact to impart the force onto the first frame portion and/or to convert forces of the forward acceleration of the second frame portion into the force onto the first frame portion).

The motion control system may impart the force (onto the first frame portion) in a plurality of operating states of the motion control system. In other words, the motion control system may be capable of imparting the force (onto the first frame portion) in each of a plurality of operating states. The plurality of operating states may include a mid-range position of the motion control system, e.g. a mid-range position as described infra. Similarly, the motion control system may impart the force irrespective of an operating state of said motion control system. In other words, the motion control system may be capable of imparting the force (onto the first frame portion) in any/every operating state (of the motion control system).

In the present disclosure, (minimum) distances, (acute) angles, relative positions, etc. that may depend on a state of the motion control system may be (narrowly) understood as being valid (i.e. measured/determined) when the vehicle is (in an unladen, neutral state) on a level surface (with the terrain-engaging elements of the vehicle contacting the level surface). Moreover, such distances, angles, relative positions, etc. may also be understood as being valid at a mid-range position of the motion control system, e.g. as described supra. Furthermore, such distances, angles, relative locations, etc. may also be broadly understood as being valid throughout the entire operating range of the motion control system.

The motion control system may comprise a first motion control device. The first motion control device may movably interconnect the first frame portion and the second frame portion. Similarly, the motion control system may comprise a second motion control device. The second motion control device may movably interconnect the first frame portion and the second frame portion. At least one of the first motion control device and the second motion control device may constitute a component of the motion control system. The motion control system may consist (exclusively) of the first motion control device and the second motion control device. The first motion control device may be located above the second motion control device. As such, a location of (at least one of an uppermost portion and a lowermost portion of) the first motion control device may be higher than a location of (an uppermost portion of) the second motion control device as measured in a vertical direction. The first motion control device may (pivotally/rigidly) connect to the second frame portion at a first location. The second motion control device may (pivotally/rigidly) connect to the second frame portion at a second location that is a fixed distance from the first location.

The motion control system may be a 4-bar linkage. A portion of the forward frame portion may constitute a first bar of the 4-bar linkage, the first motion control device may constitute a second bar of the 4-bar linkage, a portion of the rear frame portion may constitute a third bar of the 4-bar linkage, and the second motion control device may constitute a fourth bar of said 4-bar linkage.

The first motion control device may comprise a sliding element, e.g. a component configured to slidingly engage another component (of at least one of the motion control system, the first frame portion and the second frame portion). For example, the sliding element may slidingly engage the seat tube. (As noted above, the term "seat tube" is used to designate any of the seat tube, the upper seat tube portion and the lower seat tube portion for the sake of readability.) The second frame portion may be (pivotally) connected to the sliding element. The sliding element may comprise a first (circular) protrusion and a second (circular) protrusion (diametrically opposite the first protrusion). The second frame portion may (pivotally) connect to at least one of the first and second protrusions. For example, the second frame portion may comprise at least one (circular) opening/at least one tubular structure configured to (rotatably) engage the first/second protrusion.

The sliding element may be/comprise a tubular structure. The tubular structure may be termed a "sleeve". The sliding element may define a lumen having a constant cross-section relative to a longitudinal/sliding axis (of the sliding element). The cross-section may be a circular, oval or (rounded) polygonal, e.g. (rounded) rectangular or (rounded) triangular, cross-section.

The sliding element may slidingly engage the aforementioned other component (of at least one of the motion control system, the first frame portion and the second frame portion), e.g. the seat tube, such that the sliding element slides parallel to a longitudinal axis of the other component. For example, the sliding element may comprise a (tubular/generally tubular) structure that (at least partially) encircles/ surrounds an outer circumference of the other component. As such, the other component may extend into/through a lumen of the sliding element, e.g. along a longitudinal axis of the sliding element.

The sliding element may be shaped to slidingly engage the other component in a manner that inhibits rotation of the sliding element in a circumferential direction relative to (a longitudinal axis of) the other component. Similarly, the other component may be shaped to slidingly engage the sliding element in a manner that inhibits rotation of the sliding element in a circumferential direction relative to (a longitudinal axis of) the other component. The sliding element may have an inner shape that, e.g. aside from fitting tolerances, matches an outer shape of the other component.

The seat tube and/or the aforementioned other component, which may be the seat tube, may be configured such that an acute angle between a longitudinal axis of the seat tube/other component and an imaginary straight line through the first and second rotational axes is in the range of 30° to 60°, e.g. in the range of 40° to 50°. More specifically, the seat tube and/or the other component may be configured such that any of a minimum acute angle, an average acute angle and a maximum acute angle between a longitudinal axis of the seat tube/other component and an imaginary straight line through the first and second rotational axes is in the range of 30° to 60°, e.g. in the range of 40° to 50°. The seat tube and/or the other component may be configured such that the seat tube/other component slopes downwardly to the front. As such, the seat tube/other component may be configured such that a rearward portion (of a longitudinal axis) of the seat tube/other component is higher than a forward portion of (of the longitudinal axis) the seat tube/other component.

A portion of the sliding element that slidingly engages the aforementioned other component, e.g. the seat tube, may have a length of at least 8 cm, at least 12 cm or at least 16 cm. The length may be measured in a direction/along a path parallel to a longitudinal axis of the other component. The portion of the sliding element that slidingly engages the other component may have a (minimum) diameter of at least 3 cm, at least 6 cm, at least 9 cm or at least 12 cm. The diameter may be measured from a first location on a wall/surface of the sliding element that slidingly engages the other component to a second location on the wall/surface of the sliding element that slidingly engages the other component. The first location may be opposite the second location. For example, the second location may be located at an intersection of the wall/surface and a line that passes through the first location and is perpendicular to a plane tangent to the wall/surface at the first location.

The sliding element may comprise at least one rolling element, e.g. a roller bearing and/or a ball bearing. The rolling element may contact a surface of the aforementioned other component (of at least one of the motion control system, the first frame portion and the second frame portion) slidingly engaged by the sliding element. For example, the rolling element may contact a surface of the seat tube. Similarly, the other component slidingly engaged by the sliding element may comprise at least one rolling element, e.g. a roller bearing and/or a ball bearing. For example, the seat tube may comprise at least one rolling element. The rolling element may contact a surface of the sliding element.

The first motion control device may comprise a sheet-shaped component, e.g. a leaf spring. The sheet-shaped component may constitute a flexing element. A first edge portion of the sheet-shaped component may be (pivotally) connected to the first frame portion, e.g. to the seat tube, and a second edge portion of the sheet-shaped component may be (pivotally) connected to the second frame portion. The sheet-shaped component may be (substantially) of a material selected from the group consisting of steel and carbon fiber. The sheet-shaped component may resist torsion applied to the sheet-shaped component via the first and second edge portions with a force at least five, at least ten or at least twenty times larger than a force with which the sheet-shaped component resists a bending applied to the sheet-shaped component via the first and second edge portions. In the present context, bending may be understood as a motion of the first edge portion toward the second edge portion (in a direction not coplanar with the sheet-shaped component) without altering an orientation of the first edge portion relative to the second edge portion. In the present context, torsion may be understood as a motion of the first edge portion toward the second edge portion (in a direction not coplanar with the sheet-shaped component) that alters an orientation of the first edge portion relative to the second edge portion.

The first motion control device may comprise an eccentric. The eccentric may comprise/define a first axis of rotation and a second axis of rotation, the second axis of rotation being parallel to and offset from the first axis of rotation. The second axis of rotation may be offset from the first axis of rotation by at least 1 cm and/or by no more than 8 cm. The eccentric (or a portion of the eccentric) may be rotatably mounted in/rotatably connected to the first frame portion, e.g. such that a location of the first axis of rotation is fixed relative to at least one component of the first frame portion. Similarly, (a portion of) the eccentric may be rotatably mounted in/rotatably connected to the second frame portion, e.g. such that a location of the second axis of rotation is fixed relative to at least one component of the second frame portion.

The second motion control device may comprise a rigid link. The rigid link may be pivotally connected to the second frame portion, e.g. at a location that is more distal to the second rotational axis than a location at which the first motion control device is connected to the second frame portion. For example, the rigid link may be pivotally connected to an end region of the second frame portion most distal from the second rotational axis. The end region may be rearward of a forward-most region/edge of the second frame portion. The end region may constitute no more than 20%, no more than 10% or no more than 5% of a (total) volume of the second frame portion. The rigid link may be pivotally connected to the second frame portion at a location in a forward-most 30%, a forward-most 20% or a forward-most 10% of the second frame portion and/or in a lowermost 30%, a lowermost 20%, a lowermost 10% or a lowermost 5% (of the aforementioned forward-most 30%/20%/10%) of the second frame portion. The rigid link may be pivotally connected to the first frame portion, e.g. at a location in a lowermost 30%, a lowermost 20%, a lowermost 10% or a lowermost 5% of the first frame portion and/or in a most rearward 30%, a most rearward 20%, a most rearward 10% or a most rearward 5% of (the aforementioned lower(most) portion of) the first frame portion. A pivot axis of a pivotal connection of the rigid link to the first frame portion may be coaxial to the first rotational axis. The rigid link may be pivotally connected to the first frame portion at a location that is upward and/or forward of a location at which the rigid link is pivotally connected to the second frame portion. The rigid link may be "rigid" in the sense that a distance between a connection of the rigid link to the first frame portion and a connection of the rigid link to the second frame portion is invariable, does not vary by more than 5%, or does not vary by more than 1% (when the vehicle is subject to (typical) use).

At least 80%, at least 90% or (substantially) an entirety of the motion control system, e.g. of at least one of the first motion control device and the second control device, (by volume and/or by weight) may be a material selected from the group consisting of steel, aluminum and carbon fiber. Similarly, at least 80%, at least 90% or (substantially) an entirety of at least one of the first motion control device and the second control device (by volume and/or by weight) may be a material selected from the group consisting of steel, aluminum and carbon fiber. For example, an entirety of the motion control system/first motion control device/second motion control device may be of such a material except bushings and/or thread elements, e.g. for interconnecting the first/second frame portion with other structures of the vehicle. Such bushings and/or thread elements may demand wear characteristics and/or machining tolerances not achievable with aluminum or carbon fiber.

The motion control system may movably interconnect the first frame portion and the second frame portion such that motion of the second frame portion relative to the first frame portion is restricted to substantially in-plane motion. For example, motion of the second frame portion relative to the first frame portion may be restricted to a plane orthogonal to the first rotational axis and/or to a plane defined by the top tube and down tube.

Motion of the second frame portion relative to the first frame portion may be restricted (by the motion control system) to such in-plane motion by at least one of the sliding element, the sheet-shaped component, the eccentric and the rigid link. For example, motion of the second frame portion relative to the first frame portion may be restricted (by the motion control system) to such in-plane motion by virtue of a relative shape of the sliding element to the aforementioned other component (of at least one of the motion control system, the first frame portion and the second frame portion) slidingly engaged by the sliding element. As touched upon above, the sliding element may have a (partially) oval or (rounded) polygonal cross-section (that slidingly engages the other component).

The (aforementioned) tensioning of the drivetrain element may impart a first force onto the second motion control device. The drivetrain element may be a drivetrain element (e.g. a chain or belt) that transfers driving energy from (a driving axle supported by) the first frame portion to (a driven axle supported by) the second frame portion.

(The motion control system may be configured and arranged such that) a force imparted onto the motion control system by an obstacle-avoiding motion of the second frame portion may impart a second force onto the second motion control device that is no more than 45°, no more than 30°, no more than 20° or no more than 15° from perpendicular to the first force. The first force may be a tensioning force that tensions the second motion control device (between a first connection point to the first frame portion and a second connection point to the second frame portion). Similarly, the first force may be a compressing force that compresses the second motion control device (between a first connection point to the first frame portion and a second connection point to the second frame portion). The second force may be a pivoting force that pivots the second motion control device relative to at least one of the first connection point and the second connection point.

The vehicle may comprise an energy management system. The energy management system may be (at least partially) interposed between the first frame portion and the second frame portion. The energy management system may be (interposed between the first frame portion and the second frame portion by being) (pivotally) connected to the first frame portion (at at least one connection point) and may be (pivotally) connected to the second frame portion (at at least one connection point). The energy management system may influence an exchange of kinetic energy between the first and second frame portion. The energy management system may effect a time delay in a transfer of kinetic energy from the first frame portion to the second frame portion. Similarly, the energy management system may effect a time delay in a transfer of kinetic energy from the second frame portion to the first frame portion. The energy management system may receive a first amount of kinetic energy from the first frame portion and/or the second frame portion and output, in total in response to the receipt of the first amount of kinetic energy, a second amount of kinetic energy (with a time delay) to the first frame portion and/or the second frame portion, the second amount of kinetic energy being less than the first amount. The energy management system may dissipate an amount of energy equal to a difference between the first amount of kinetic energy and the second amount of kinetic energy as heat. The energy management system may be a (purely) mechanical system. The energy management system may be a (purely) passive system.

The energy management system may comprise a shock absorber. The shock absorber may interconnect the first and second frame portions. The shock absorber may be pivotally linked to the second frame portion. The shock absorber may be pivotally linked to the first frame portion, e.g. to the top tube or the down tube. The shock absorber may be configured such that a shortening/lengthening of a distance between a pivot axis at which the shock absorber is linked to the second frame portion and a pivot axis at which the shock absorber is linked to the first frame portion induces (shock absorbing, linear) travel of the shock absorber.

An operating state exhibited by the energy management system when no external forces (that would induce a (substantial) change in operating state) are applied to the energy management system may be termed a "neutral state". Similarly, the neutral state may be an operating state in which the energy management system stores no potential energy (that can be converted by the energy management system into kinetic energy). The motion control system and the energy management system may be configured such that (the (inherently) limited range of motion of) the motion control system restricts motion of the energy management system to within the (designed/permissible) range of travel of the energy management system.

The energy management system may comprise at least one material and/or component that absorbs and stores energy, i.e. converts kinetic energy into potential energy, e.g. by elastic deformation, as the energy management system transitions to a first operating state different from the neutral state. The material may be an elastic material. The component may be a (steel/air) spring. The (at least one material and/or component of the) energy management system may be configured to convert the stored (potential) energy into kinetic energy as the energy management system transitions to the neutral state from the first operating state. More generally, the energy management system may comprise at least one material and/or component that converts kinetic energy into potential energy as the energy management system transitions to any operating state (within the range of travel of the energy management system) different from the neutral state, which at least one material and/or component converts said potential energy into kinetic energy as the energy management system transitions to the neutral state from said any operating state. The energy management system may comprise at least one material and/or component that converts kinetic energy into potential energy as the energy management system transitions "away from" the neutral state, i.e. from any operating state (within the range of travel of the energy management system) to any other (within the range of travel of the energy management system) more removed from the neutral state, which at least one material and/or component converts said potential energy into kinetic energy as the energy management system transitions "toward" the neutral state, i.e. to said any operating state from said any other operating state. For the sake of conciseness, such conversion of kinetic energy to potential energy and such conversion of potential energy into kinetic energy will be termed "lossless conversion" as a shorthand notation.

Similarly, the energy management system may comprise at least one material and/or component that converts kinetic energy into heat as the energy management system transitions to a first operating state different from the neutral state. The material may be a (viscous) oil. The component may be/comprise a friction surface. The component may be/comprise a nozzle. The (at least one material and/or component of the) energy management system may be configured to convert kinetic energy into heat as the energy management system transitions to the neutral state from the first operating state. More generally, the energy management system may comprise at least one material and/or component that converts kinetic energy into heat as the energy management system transitions to any operating state (within the range of travel of the energy management system) different from the neutral state, which at least one material and/or component may moreover convert kinetic energy into heat as the energy management system transitions to the neutral state from said any operating state. The energy management system may comprise at least one material and/or component that converts kinetic energy into heat as the energy management system transitions "away from" the neutral state, i.e. from any operating state (within the range of travel of the energy management system) to any other (within the range of travel of the energy management system) more removed from the neutral state, which at least one material and/or component may moreover convert kinetic energy into heat as the energy management system transitions "toward" the neutral state, i.e. to said any operating state from said any other operating state. For the sake of conciseness, such conversion of kinetic energy to heat will be termed "lossy conversion" as a shorthand notation.

A ratio of lossless conversion to overall (i.e. lossy plus lossless) conversion exhibited by the energy management system may depend, inter alia, on an operating state of the energy management system, e.g. on a "distance" of the instant operating state from the neutral state (in terms of travel) and/or on whether the energy management system is transitioning "away from" or "toward" the neutral state. The ratio of lossless conversion to overall (i.e. lossy plus lossless) conversion exhibited by the energy management system may be user adjustable, e.g. by means of switches and/or dials (as known in the art). Accordingly, the ratio of lossless conversion to overall conversion exhibited by the energy management system may depend, inter alia, on a (user adjustable) mode of the energy management system.

The energy management system may be configured such that the vehicle, in a neutral (i.e. non-dynamic), payload-bearing state, exhibits squat (a.k.a. "sag") in the range of 15% to 35%. The payload-bearing state may be a state in which the vehicle is bearing a payload in the range of 50 kg to 100 kg. In the present disclosure, the term "squat" may be understood as designating an operating state in which the first rotational axis/bottom bracket is lower (i.e. closer to the terrain) than the first rotational axis/bottom bracket in an unladen, neutral state. Squat may be expressed as a percentage of travel between an unladen, neutral state and a (respective) end of range (e.g. as limited by the motion control system). In the present disclosure, the term "anti-squat" (a.k.a. "jacking") may be understood as designating an operating state in which the first rotational axis/bottom bracket is higher (i.e. farther from the terrain) than the first rotational axis/bottom bracket in an unladen, neutral state. Anti-squat may be expressed as a percentage of travel between an unladen, neutral state and a (respective) end of range (e.g. as limited by the motion control system).

The unladen, neutral state may correspond to a mid-range position of the motion control system, e.g. as defined supra. Defining the unladen, neutral state on a linear scale representative of a percentage of the total amount of linear sliding motion permitted at the sliding element by the operating range of the motion control system or a percentage of a total amount of rotation permitted at any pivotal connection point of the motion control system to the first/second frame portion by the operating range of the motion control system, where a (full) anti-squat end of range of the motion control system corresponds to 0%, the mid-range position corresponds to 50% and a (full) squat end of range of the motion control system corresponds to 100%, the unladen, neutral state may be in the range of 30% to 50%, e.g. in the range of 30% to 40% or 40% to 50%, or in the range of 50% to 70%, e.g. in the range of 50% to 60% or 60% to 70%.

As touched upon above, the characteristics of the energy management system may be direction dependent. For example, the characteristics of the energy management system when transitioning "away from" the neutral state may differ from characteristics of the energy management system when transitioning "toward" the neutral state. Hereinbelow, an imparting of "kinetic energy of squat inducing motion" into the energy management system may be understood as kinetic energy imparted into the energy management system as a result of motion (of elements of the vehicle) that yields further squat, i.e. an imparting of kinetic energy into the energy management system as the energy management system transitions in a squat direction, i.e. in a direction of a state of the energy management system corresponding to (full) squat. Similarly, an imparting of "kinetic energy of motion inducing less anti-squat" into the energy management system may be understood as kinetic energy imparted into the energy management system as a result of motion (of elements of the vehicle) that yields less anti-squat, i.e. an imparting of kinetic energy into the energy management system as the energy management system transitions in a direction of a state of the energy management system corresponding to (full) squat. These remarks apply, mutatis mutandis, to similar expressions such as "kinetic energy of motion inducing less squat" and "kinetic energy of anti-squat inducing motion".

The vehicle may be configured such that, at 25% squat, at least 60%, at least 70%, at least 80% or at least 90% of kinetic energy (of squat inducing motion) imparted, e.g. via the first and/or second rotational axis, into the energy management system is converted into potential energy. The vehicle may be configured such that, in a range of 0% to 60% squat, at least 60%, at least 70%, at least 80% or at least 90% of kinetic energy (of squat inducing motion) imparted, e.g. via the first and/or second rotational axis, into the energy management system is converted into potential energy. The vehicle may be configured such that, in a range of 0% to 60% anti-squat, at least 60%, at least 70%, at least 80% or at least 90% of kinetic energy (of anti-squat inducing motion) imparted, e.g. via the first and/or second rotational axis, into the energy management system is converted into potential energy. The vehicle may be configured such that, in a range of 40% to 75% squat, at least 50%, at least 60%, at least 70% or at least 80% of kinetic energy (of squat inducing motion) imparted, e.g. via the first and/or second rotational axis, into the energy management system is converted into potential energy. The vehicle may be configured such that, in a range of 40% to 75% anti-squat, at least 60%, at least 70% or at least 80% of kinetic energy (of anti-squat inducing motion) imparted, e.g. via the first and/or second rotational axis, into the energy management system is converted into potential energy.

The vehicle may be configured such that, in a range of 70% to 90% squat, at least 30%, at least 40%, at least 50% or at least 60% of kinetic energy (of squat inducing motion) imparted, e.g. via the first and/or second rotational axis, into the energy management system is converted into potential energy. The vehicle may be configured such that, in a range of 70% to 90% anti-squat, at least 30%, at least 40%, at least 50% or at least 60% of kinetic energy (of anti-squat inducing motion) imparted, e.g. via the first and/or second rotational axis, into the energy management system is converted into potential energy. The vehicle may be configured such that, in a range of 90% to 0% anti-squat, e.g. a range of 70% to 0% anti-squat, not more than 15%, not more than 10% or not more than 5% of kinetic energy (of motion inducing less anti-squat) imparted, e.g. via the first and/or second rotational axis, into the energy management system is converted into heat. The vehicle may be configured such that, in a range of 90% to 0% squat, e.g. a range of 70% to 0% squat, not more than 15%, not more than 10% or not more than 5% of kinetic energy (of motion inducing less squat) imparted, e.g. via the first and/or second rotational axis, into the energy management system is converted into heat.

The energy management system, at 25% squat, e.g. relative to a mid-range position (of the energy management system), may convert at least 60%, at least 70%, at least 80% or at least 90% of kinetic energy (of squat inducing motion) imparted into the energy management system into potential energy. The energy management system may, in a range of 0% to 60% squat, e.g. relative to a mid-range position (of the energy management system), convert at least 60%, at least 70%, at least 80% or at least 90% of kinetic energy (of squat inducing motion) imparted into the energy management system into potential energy. The energy management system, in a range of 0% to 60% anti-squat, e.g. relative to a mid-range position (of the energy management system), may convert at least 60%, at least 70%, at least 80% or at least 90% of kinetic energy (of anti-squat inducing motion) imparted into the energy management system into potential energy. The energy management system, in a range of 40% to 75% squat, e.g. relative to a mid-range position (of the energy management system), may convert at least 50%, at least 60%, at least 70% or at least 80% of kinetic energy (of squat inducing motion) imparted into the energy management system into potential energy. The energy management system, in a range of 40% to 75% anti-squat, e.g. relative to a mid-range position (of the energy management system), may convert at least 60%, at least 70% or at least 80% of kinetic energy (of anti-squat inducing motion) imparted into the energy management system into potential energy. The energy management system, in a range of 70% to 90% squat, e.g. relative to a mid-range position (of the energy management system), may convert at least 30%, at least 40%, at least 50% or at least 60% of kinetic energy (of squat inducing motion) imparted into the energy management system into potential energy. The energy management system, in a range of 70% to 90% anti-squat, e.g. relative to a mid-range position (of the energy management system), may convert at least 30%, at least 40%, at least 50% or at least 60% of kinetic energy (of anti-squat inducing motion) imparted into the energy management system into potential energy. The energy management system may be configured such that, in a range of 90% to 0% anti-squat, e.g. relative to a mid-range position (of the energy management system), e.g. a range of 70% to 0% anti-squat, not more than 15%, not more than 10% or not more than 5% of kinetic energy (of motion inducing less anti-squat) imparted into the energy management system is converted into heat. The energy management system may be configured such that, in a range of 90% to 0% squat, e.g. relative to a mid-range position (of the energy management system), e.g. a range of 70% to 0% squat, not more than 15%, not more than 10% or not more than 5% of kinetic energy (of motion inducing less squat) imparted into the energy management system is converted into heat.

The mid-range position (of the energy management system) may correspond to a position halfway between the respective ends of the range of travel of the energy management system. Defining the mid-range position (of the energy management system) on a linear scale representative of a percentage of the total range of travel of the energy management system, where a (full) anti-squat end of range of the travel corresponds to 0%, the mid-range position corresponds to 50% and a (full) squat end of range of the travel corresponds to 100%, the mid-range position may be in the range of 30% to 50%, e.g. in the range of 30% to 40% or 40% to 50%, or in the range of 50% to 70%, e.g. in the range of 50% to 60% or 60% to 70%. The range of travel of the energy management system may be limited by the motion control system. Defining the mid-range position (of the energy management system) on a linear scale representative of a percentage of the total amount of linear sliding motion permitted at the sliding element by the operating range of the motion control system or a percentage of a total amount of rotation permitted at any pivotal connection point of the motion control system to the first/second frame portion by the operating range of the motion control system, where a (full) anti-squat end of range of the motion control system corresponds to 0%, the mid-range position corresponds to 50% and a (full) squat end of range of the motion control system corresponds to 100%, the mid-range position may be in the range of 30% to 50%, e.g. in the range of 30% to 40% or 40% to 50%, or in the range of 50% to 70%, e.g. in the range of 50% to 60% or 60% to 70%.

A ratio of lossless conversion to overall (i.e. lossy plus lossless) conversion exhibited by the combination of vehicle and payload may be characterized/defined by a "damping ratio" (as known in the art). The damping ratio may be measured/determined without regard for a damping effect of the terrain-engaging elements and/or without regard for a damping effect of a front suspension. The damping ratio may be measured/determined (exclusively) in terms of an oscillatory response of the second frame portion relative to the payload-bearing front frame portion, e.g. in response to forces induced at the second rotational axis (by traveling over terrain). The payload may be a payload in the range of 50 kg to 100 kg. The damping ratio may be a damping ratio of less than 0.3, less than 0.2 or less than 0.1.

The motion control system may be configured such that a forward acceleration of the rear frame portion, e.g. a forward acceleration resulting from a driving force imparted by a wheel supported by the rear frame portion, does not reduce an obstacle-avoiding range of motion of the motion control system. In the present disclosure, the obstacle-avoiding range of motion of the motion control system may be understood as a range of motion available to the motion control system between the (respective, current) operational state (at the time of (initially) encountering a respective obstacle, e.g. a rock, log or bump) and a respective end-of-range position (to which the motion control system is constrained as discussed supra), e.g. as the motion control system transitions from the (respective, current) operational state toward the respective end-of-range position in response to a rear wheel of the vehicle encountering the respective obstacle. Similarly, the obstacle-avoiding range of motion of the motion control system may be understood as a distance between the (respective, current) position (of at least one component) of the motion control system (at the time of (initially) encountering a respective obstacle) and the respective end-of-range position (of the at least one component) of the motion control system). The encountering of a respective obstacle may impart a force (on the rear wheel that, in turn, imparts a force) on (the rear frame portion at) the second rotational axis in an upward and rearward direction. An acute angle between the force on (the rear frame portion at) the second rotational axis and an imaginary straight line through the first and second rotational axes may be in the range of 20° to 70°, e.g. in the range of 30° to 60° or in the range of 40° to 50°. Moreover, the motion control system may be configured such that (such) a forward acceleration of the rear frame portion increases an obstacle-avoiding range of motion of the motion control system. As such, the motion control system may be configured such that a forward acceleration of the rear frame portion induces a movement of the motion control system toward an end-of-range position opposite the (aforementioned) end-of-range position (toward which the motion control system moves in response to a rear wheel of the vehicle encountering a respective obstacle).

The motion control system may exhibit an instantaneous center of rotation, e.g. as known in the art of mechanical engineering. For example, the instantaneous center of rotation may be at the intersection of a first imaginary line through points at which the first motion control device (pivotally/rigidly) connects to the first and second frame portions, respectively, and a second imaginary line through points at which the second motion control device (pivotally/rigidly) connects to the first and second frame portions, respectively. Similarly, the instantaneous center of rotation may be at the intersection of the slide axis of the sliding element of the first motion control device and an imaginary line through points at which the second motion control device (pivotally/rigidly) connects to the first and second frame portions, respectively.

The instantaneous center of rotation of the motion control system may be located forward of the first rotational axis defined by the first frame portion, e.g. by at least 5 cm, at least 10 cm or at least 15 cm. The instantaneous center of rotation of the motion control system may be located in (or at a vertical location corresponding to) a lower portion of the first frame portion, e.g. a lowermost 30%, a lowermost 20%, a lowermost 10% or a lowermost 5% of the first frame portion. The instantaneous center of rotation of the motion control system may be located forward of the seat tube. The vehicle component may be configured such that a minimum distance between the instantaneous center of rotation of the motion control system and (an extension of) an imaginary straight line coaxial with a driving segment of a chain/belt of the drivetrain is no more than 5 cm, no more than 8 cm or no more than 10 cm. Similarly, the vehicle component may be configured such that a minimum distance between the instantaneous center of rotation of the motion control system and (an extension of) an imaginary straight line through the first and second rotational axes is no more than 8 cm, no more than 10 cm or no more than 15 cm.

The vehicle component may be configured such that the instantaneous center of rotation of the motion control system is located above (an imaginary straight line through the second rotational axis and) the first rotational axis. The vehicle component may be configured such that a straight line through the instantaneous center of rotation of the motion control system and perpendicular to a shortest imaginary straight line between the first rotational axis and the top tube intersects that shortest imaginary straight line at a location between the first rotational axis and the top tube. The vehicle component may be configured such that a first imaginary straight line through the instantaneous center of rotation of the motion control system and perpendicular to a second imaginary straight line through the first rotational axis and perpendicular to a third imaginary straight line through the first and second rotational axes intersects that second imaginary straight line upward of the first rotational axis, e.g. at a location between the first rotational axis and the top tube/an uppermost intersection of that second imaginary straight line and the first frame portion.

The vehicle component may be configured such that at least one of the first rotational axis defined by the first frame portion and the second rotational axis defined by the second frame portion is located within an angle enclosed by a first ray through points at which the first motion control device (pivotally/rigidly) connects to the first and second frame portions, respectively, and a second ray through points at which the second motion control device (pivotally/rigidly) connects to the first and second frame portions, respectively, which angle has the instantaneous center of rotation of the motion control system as a vertex. Similarly, the vehicle component may be configured such that at least one of the first rotational axis defined by the first frame portion and the second rotational axis defined by the second frame portion is located within an angle enclosed by a first ray along the slide axis of the sliding element of the first motion control device and a second ray through points at which the second motion control device (pivotally/rigidly) connects to the first and second frame portions, respectively, which angle has the instantaneous center of rotation of the motion control system as a vertex.

The vehicle component may be configured such that a distance from the instantaneous center of rotation of the motion control system to the first rotational axis is no more than 40%, no more than 30%, no more than 20% or no more than 10% of a distance from the instantaneous center of rotation of the motion control system to the second rotational axis. The vehicle component may be configured such that a distance from the instantaneous center of rotation of the motion control system to the first rotational axis is at least 5%, at least 10% or at least 15% of a distance from the instantaneous center of rotation of the motion control system to the second rotational axis.

The motion control system may be configured to induce a motion of the first rotational axis in a direction of a (first)

imaginary straight line through an instantaneous center of rotation of the motion control system and the second rotational axis in response to a force drawing the second rotational axis toward the first rotational axis. The force may be a tensioning force on a chain/belt of the drivetrain, e.g. a tensioning force on induced by the driving sprocket on a segment of the chain/belt connecting the driving sprocket and the driven sprocket. Similarly, the motion control system may be configured to induce a motion of the first rotational axis in a direction of an imaginary straight line coaxial with a driving segment of a chain/belt of the drivetrain in response to a force drawing the second rotational axis toward the first rotational axis.

As touched upon above, the motion control system may be configured such that, when the rear frame portion is accelerated, e.g. by a driving force of a rear wheel supported by the rear frame portion against the ambient terrain, the motion control system adopts a state of equilibrium by virtue of a geometric arrangement of the motion control system. Moreover, the elements constituting the motion control system may be geometrically arranged such that the elements, in response to a forward acceleration of the rear frame portion, inherently move to an operating state in which forces imparted onto the motion control system by
 a tensioning of a drivetrain element that transfers driving energy from a driving axle supported by the forward frame portion to a driven axle supported by the rear frame portion,
 the forward acceleration of the rear frame portion, and
 an acceleration of a user mass supported by (a seat support portion of) the forward frame portion
are in equilibrium. Such an operating state may likewise be termed a "state of equilibrium". The motion control system may be configured to adopt/move to the state of equilibrium (by virtue of a geometric arrangement and) with the aid of the energy management device. Similarly, the motion control system may be configured to adopt/move to the state of equilibrium without the aid of the energy management device. The motion control system may be configured to adopt/move to the state of equilibrium without any elements of the vehicle (per se) providing (non-negligible) energy storage and/or (non-negligible) energy damping. The motion control system may be configured to adopt/move to the state of equilibrium without any elements of the motion control system (per se) providing (non-negligible) energy storage and/or (non-negligible) energy damping. In the present context, (non-negligible) energy storage/damping may be understood as a storage/damping of more than 1%, more than 2% or more than 5% of a kinetic energy transferred into the motion control system from the rear frame portion. The motion control system may be configured to adopt/move to the state of equilibrium without any elements of the vehicle (per se), with the exception of the flexing element, providing (non-negligible) energy storage and/or (non-negligible) energy damping. The motion control system may be configured to adopt/move to the state of equilibrium without any elements of the motion control system (per se), with the exception of the flexing element, providing (non-negligible) energy storage and/or (non-negligible) energy damping.

The various embodiments of the present disclosure having been described above in general terms, the embodiments shown in the Figures will now be elucidated.

FIG. 1A schematically depicts a first exemplary embodiment of a vehicle 100 in accordance with the present disclosure, e.g. as described above.

In the illustrated embodiment, vehicle 100 comprises a first frame portion 110, a second frame portion 120, a motion control system 130, a front fork 140, a front wheel 150 and a rear wheel 160. First frame portion 110 comprises a top tube 112, a head tube 114, a down tube 116 and a seat tube 118 in addition to a seat support portion 115, a bottom bracket region 117 and a bottom bracket shell 119 located in and supported by bottom bracket region 117. Second frame portion 120 comprises an elevated chain stay 124 that supports a rear axle 162 of rear wheel 160. Similarly, front fork 140 supports a front axle 152 of front wheel 150. Motion control system 130 comprises a sliding element 132 (constituting a first motion control device) and a rigid link 134 (constituting a second motion control device), rigid link 134 being pivotally connected to first frame portion 110 and second frame portion 120. In the illustrated embodiment, rigid link 134 is pivotally connected to (a forward, lower portion of) second frame portion 120 by means of a pivotal connection 135, and a pivot axis of a pivotal connection of rigid link 134 to first frame portion 110 is coaxial to a rotational axis defined by bottom bracket shell 119. Sliding element 132 encircles an outer circumference of seat tube 118, sliding element 132 thus slidingly engaging seat tube 118 such that sliding element 132 is free to slide parallel to a linear longitudinal axis of seat tube 118. In the illustrated embodiment, sliding element 132 is pivotally connected to (a forward portion of) second frame portion 120 by means of a pivotal connection 133.

Figure 1B:
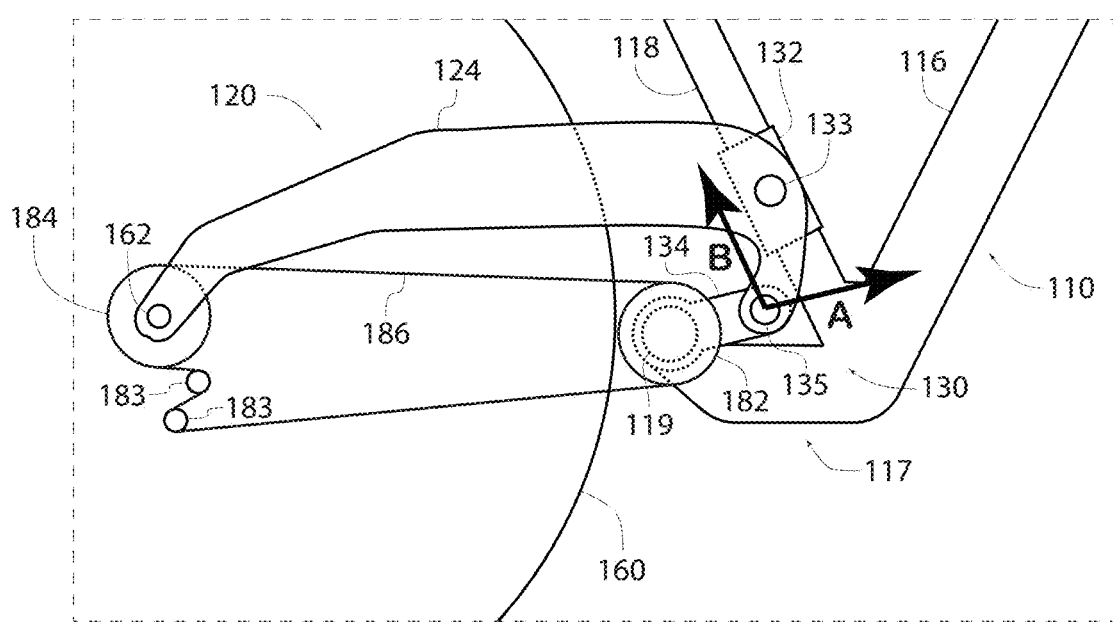
FIG. 1B a schematic depiction of additional elements of the embodiment of FIG. 1A.

FIG. 1B shows a schematic depiction of additional elements of the embodiment of FIG. 1A.

In addition to elements already discussed in the context of FIG. 1A supra, FIG. 1B shows a driving sprocket 182, a driven sprocket 184 and a chain 186 that wraps around two tensioning sprockets 183 as known in the art. FIG. 1B furthermore shows an arrow A representing a direction of a force imparted onto rigid link 134 (constituting a second motion control device of the vehicle) by a tensioning of a drivetrain element in the form of chain 186. FIG. 1B moreover shows an arrow B representing a direction of a force imparted onto rigid link 134 (constituting a second motion control device of the vehicle) by an obstacle-avoiding motion of the second frame portion 120.

Figure 2:
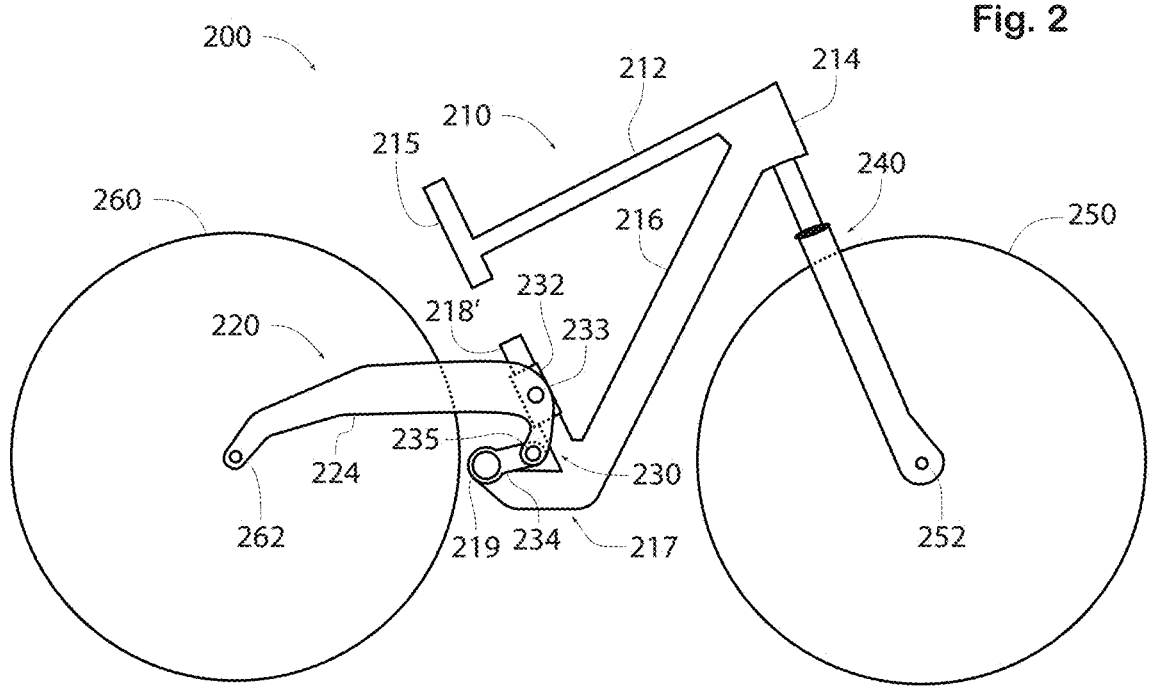
FIG. 2 a schematic depiction of a second exemplary embodiment of a vehicle in accordance with the present disclosure.

FIG. 2 schematically depicts a second exemplary embodiment of a vehicle 200 in accordance with the present disclosure, e.g. as described above.

In the illustrated embodiment, vehicle 200 comprises a first frame portion 210, a second frame portion 220, a motion control system 230, a front fork 240, a front wheel 250 and a rear wheel 260. First frame portion 210 comprises a top tube 212, a head tube 214, a down tube 216 and a lower seat tube portion 218' in addition to a seat support portion 215, a bottom bracket region 217 and a bottom bracket shell 219 located in and supported by bottom bracket region 217. Second frame portion 220 comprises an elevated chain stay 224 that supports a rear axle 262 of rear wheel 260. Similarly, front fork 240 supports a front axle 252 of front wheel 250. Motion control system 130 comprises a sliding element 232 and a rigid link 234, rigid link 234 being pivotally connected to first frame portion 210 and second frame portion 220. In the illustrated embodiment, rigid link 234 is pivotally connected to (a forward, lower portion of) second frame portion 220 by means of a pivotal connection 235, and a pivot axis of a pivotal connection of rigid link 234 to first frame portion 210 is coaxial to a rotational axis defined by bottom bracket shell 219. Sliding element 232 encircles an outer circumference of lower seat tube portion 218', sliding element 232 thus slidingly engaging lower seat tube portion 218' such that sliding element 232 is free to slide parallel to a linear longitudinal axis of lower seat tube portion 218'. In the illustrated embodiment, sliding element 232 is pivotally connected to (a forward portion of) second frame portion 220 by means of a pivotal connection 233.

Figure 3:
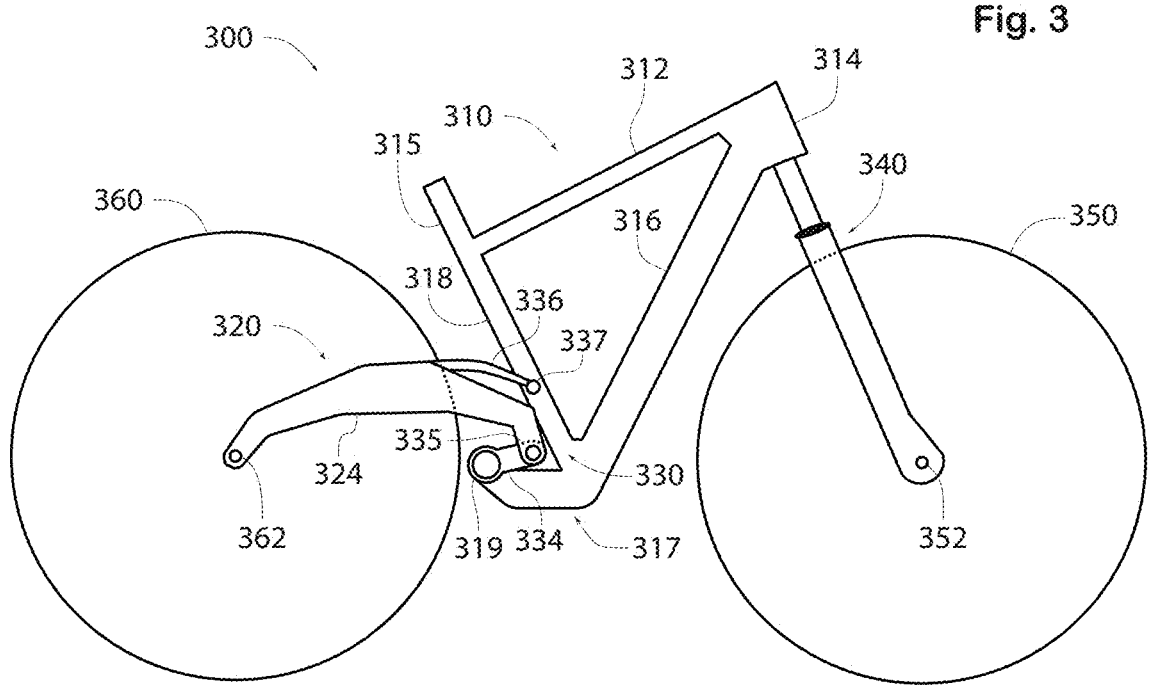
FIG. 3 a schematic depiction of a third exemplary embodiment of a vehicle in accordance with the present disclosure.

FIG. 3 schematically depicts a third exemplary embodiment of a vehicle 300 in accordance with the present disclosure, e.g. as described above.

In the illustrated embodiment, vehicle 300 comprises a first frame portion 310, a second frame portion 320, a motion control system 330, a front fork 340, a front wheel 350 and a rear wheel 360. First frame portion 310 comprises a top tube 312, a head tube 314, a down tube 316 and a seat tube 318 in addition to a seat support portion 315, a bottom bracket region 317 and a bottom bracket shell 319 located in and supported by bottom bracket region 317. Second frame portion 320 comprises an elevated chain stay 324 that supports a rear axle 362 of rear wheel 360. Similarly, front fork 340 supports a front axle 352 of front wheel 350. Motion control system 330 comprises a flexing element 336 and a rigid link 334, rigid link 334 being pivotally connected to first frame portion 310 and second frame portion 320. In the illustrated embodiment, rigid link 334 is pivotally connected to (a forward, lower portion of) second frame portion 320 by means of a pivotal connection 335, and a pivot axis of a pivotal connection of rigid link 334 to first frame portion 310 is coaxial to a rotational axis defined by bottom bracket shell 319. A first end of flexing element 336 is pivotally connected to first frame portion 310 by means of a pivotal connection 337 and a second end of flexing element 336 is rigidly connected to second frame portion 320.

Figure 4:
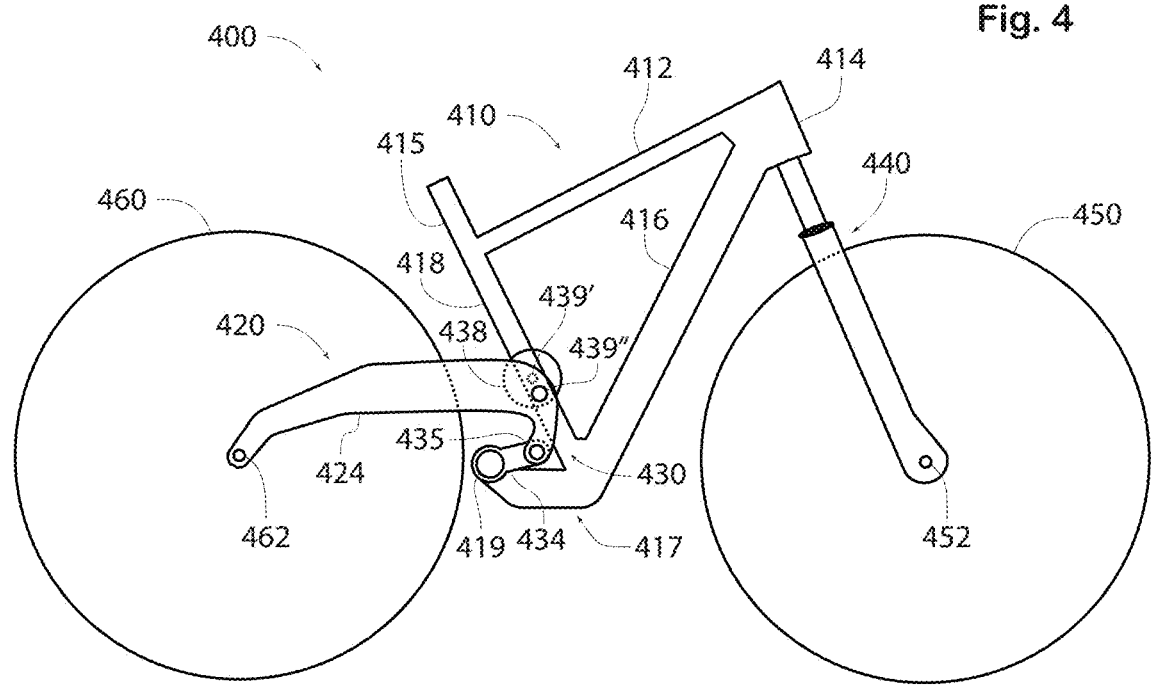
FIG. 4 a schematic depiction of a fourth exemplary embodiment of a vehicle in accordance with the present disclosure.

FIG. 4 schematically depicts a fourth exemplary embodiment of a vehicle 400 in accordance with the present disclosure, e.g. as described above.

In the illustrated embodiment, vehicle 400 comprises a first frame portion 410, a second frame portion 420, a motion control system 430, a front fork 440, a front wheel 450 and a rear wheel 460. First frame portion 410 comprises a top tube 412, a head tube 414, a down tube 416 and a seat tube 418 in addition to a seat support portion 415, a bottom bracket region 417 and a bottom bracket shell 419 located in and supported by bottom bracket region 417. Second frame portion 420 comprises an elevated chain stay 424 that supports a rear axle 462 of rear wheel 460. Similarly, front fork 440 supports a front axle 452 of front wheel 450. Motion control system 430 comprises an eccentric 438 and a rigid link 434, rigid link 434 being pivotally connected to first frame portion 410 and second frame portion 420. In the illustrated embodiment, rigid link 434 is pivotally connected to (a forward, lower portion of) second frame portion 420 by means of a pivotal connection 435, and a pivot axis of a pivotal connection of rigid link 434 to first frame portion 410 is coaxial to a rotational axis defined by bottom bracket shell 419. Eccentric 438 is rotatably connected to first frame portion 410 via a first rotational axis 439'. Similarly, eccentric 438 is rotatably connected to second frame portion 420 via a second rotational axis 439" (that is offset from first rotational axis 439').

Figure 5:
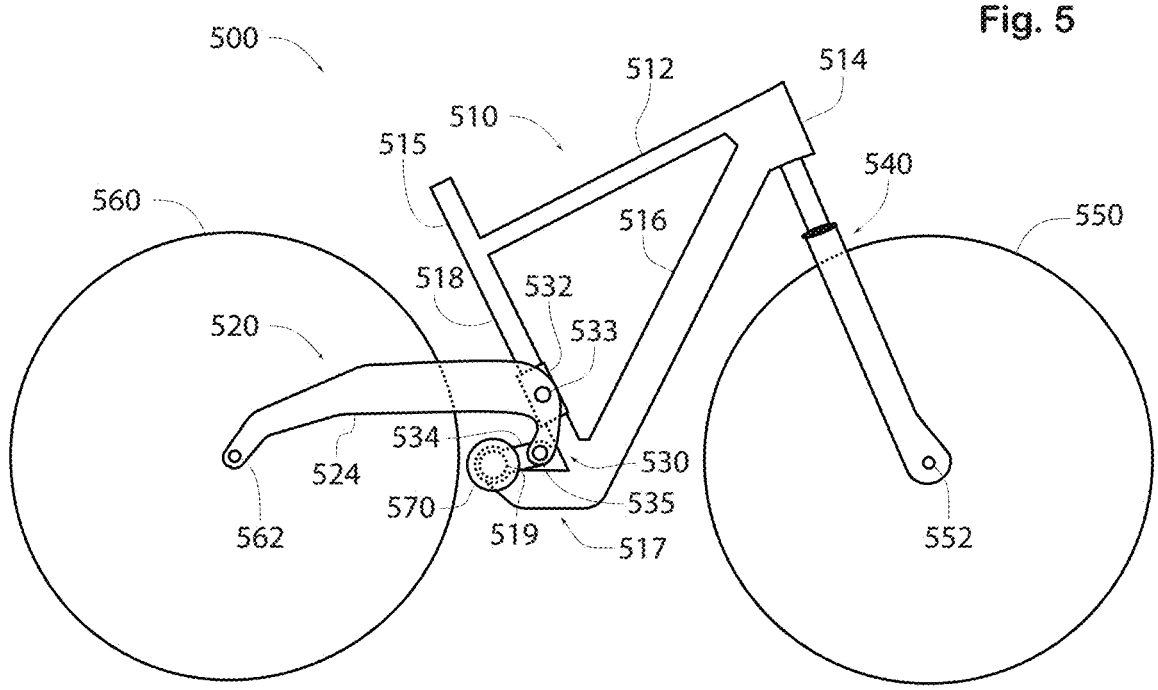
FIG. 5 a schematic depiction of a fifth exemplary embodiment of a vehicle in accordance with the present disclosure.

FIG. 5 schematically depicts a fifth exemplary embodiment of a vehicle 500 in accordance with the present disclosure, e.g. as described above.

In the illustrated embodiment, vehicle 500 comprises a first frame portion 510, a second frame portion 520, a motion control system 530, a front fork 540, a front wheel 550, a rear wheel 560 and an electric motor 570. First frame portion 510 comprises a top tube 512, a head tube 514, a down tube 516 and a seat tube 518 in addition to a seat support portion 515, a bottom bracket region 517 and a bottom bracket shell 519 located in and supported by bottom bracket region 517. Second frame portion 520 comprises an elevated chain stay 524 that supports a rear axle 562 of rear wheel 560. Similarly, front fork 540 supports a front axle 552 of front wheel 550. Motion control system 530 comprises a sliding element 532 and a rigid link 534, rigid link 534 being pivotally connected to first frame portion 510 and second frame portion 520. In the illustrated embodiment, rigid link 534 is pivotally connected to (a forward, lower portion of) second frame portion 520 by means of a pivotal connection 535, and a pivot axis of a pivotal connection of rigid link 534 to first frame portion 510 is coaxial to a rotational axis defined by bottom bracket shell 519. Sliding element 532 encircles an outer circumference of seat tube 518, sliding element 532 thus slidingly engaging seat tube 518 such that sliding element 532 is free to slide parallel to a linear longitudinal axis of seat tube 518. In the illustrated embodiment, sliding element 532 is pivotally connected to (a forward portion of) second frame portion 520 by means of a pivotal connection 533.

Figure 6A:
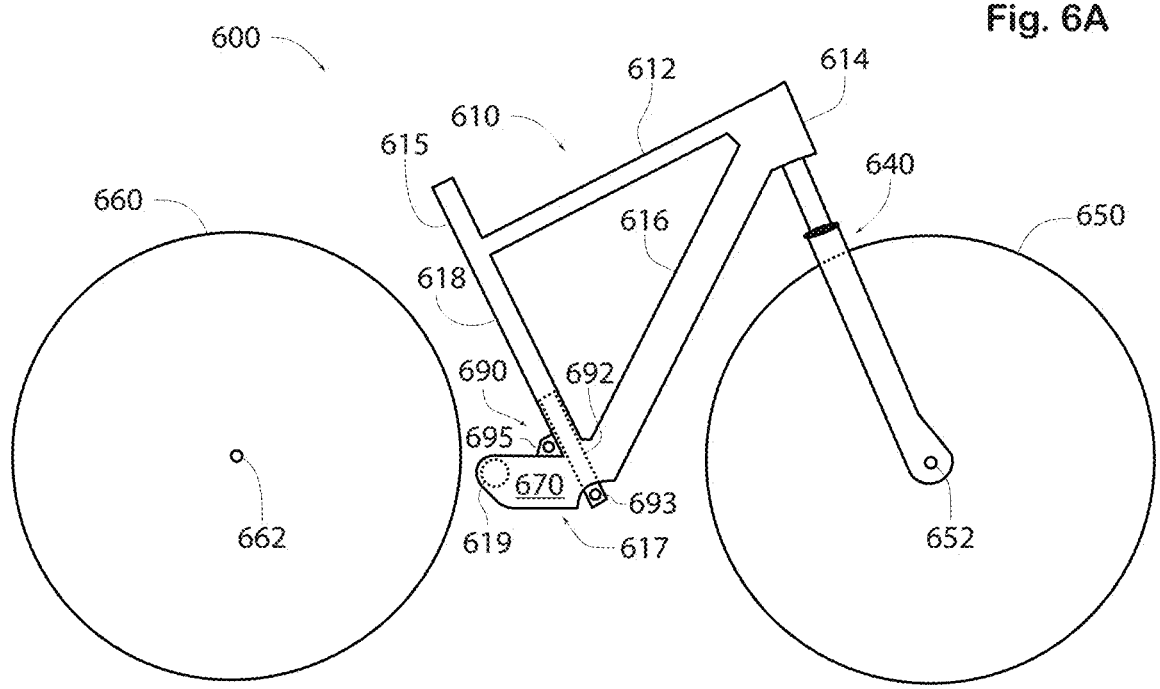
FIG. 6A a schematic depiction of a sixth exemplary embodiment of a vehicle in accordance with the present disclosure.
Figure 6B:
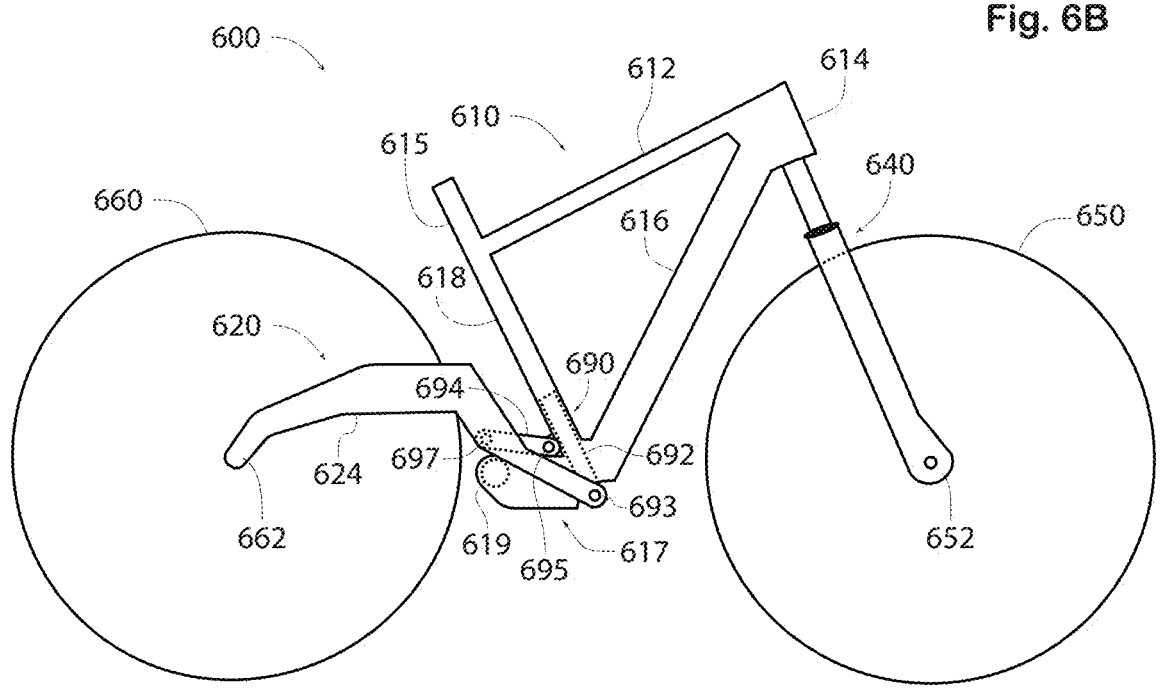
FIG. 6B a schematic depiction of additional elements of the embodiment of FIG. 6A.

FIGS. 6A and 6B schematically depict a sixth exemplary embodiment of a vehicle 600 in accordance with the present disclosure, e.g. as described above. For the sake of better depiction, FIG. 6A shows vehicle 600 without certain features shown in FIG. 6B that would otherwise obscure certain features of vehicle 600.

In the illustrated embodiment, vehicle 600 comprises a first frame portion 610, a second frame portion 620 (not shown in FIG. 6A), a motion control system 690, a front fork 640, a front wheel 650, a rear wheel 660 and an electric motor 670. First frame portion 610 comprises a top tube 612, a head tube 614, a down tube 616 and a seat tube 618 in addition to a seat support portion 615, a bottom bracket region 617 and a bottom bracket shell 619 located in and supported by bottom bracket region 617. Second frame portion 620 comprises an elevated chain stay 624 that supports a rear axle 662 of rear wheel 660.

Similarly, front fork 640 supports a front axle 652 of front wheel 650. In the illustrated embodiment, motion control system 690 comprises a sliding element 692 and a rigid link 694 (likewise not shown in FIG. 6A), sliding element being slidingly arranged in a lower portion of first frame portion 610, namely in (a lower portion of) seat tube 618 such that sliding element 692 is free to slide parallel to a linear longitudinal axis of seat tube 618. A first end of rigid link 694 is pivotally connected to (a rearward portion of) first frame portion 610 at a pivotal connection 695, and a second end of rigid link 694 is pivotally connected to (a forward portion of) second frame portion 620 at a pivotal connection 697. Sliding element 692 is pivotally connected to (a forward, lower portion of) second frame portion 620 at a pivotal connection 693.

In the present disclosure, the verb "may" is used to designate optionality/noncompulsoriness. In other words, something that "may" can, but need not. In the present disclosure, the verb "comprise" may be understood in the sense of including. Accordingly, the verb "comprise" does not exclude the presence of other elements/actions. In the present disclosure, relational terms such as "first," "second," "top," "bottom" and the like may be used solely to distinguish one entity or action from another entity or action without necessarily requiring or implying any actual such relationship or order between such entities or actions.

In the present disclosure, the term "any" may be understood as designating any number of the respective elements, e.g. as designating one, at least one, at least two, each or all of the respective elements. Similarly, the term "any" may be understood as designating any collection(s) of the respective elements, e.g. as designating one or more collections of the respective elements, wherein a (respective) collection may comprise one, at least one, at least two, each or all of the respective elements. The respective collections need not comprise the same number of elements.

In the present disclosure, the expression "at least one" is used to designate any (integer) number or range of (integer) numbers (that is technically reasonable in the given context). As such, the expression "at least one" may, inter alia, be understood as one, two, three, four, five, ten, fifteen, twenty or one hundred. Similarly, the expression "at least one" may, inter alia, be understood as "one or more," "two or more" or "five or more."

In the present disclosure, expressions in parentheses may be understood as being optional. As used in the present disclosure, quotation marks may emphasize that the expression in quotation marks may also be understood in a figurative sense. As used in the present disclosure, quotation marks may identify a particular expression under discussion.

In the present disclosure, many features are described as being optional, e.g. through the use of the verb "may" or the use of parentheses. For the sake of brevity and legibility, the present disclosure does not explicitly recite each and every combination and/or permutation that may be obtained by choosing from the set of optional features. However, the present disclosure is to be interpreted as explicitly disclosing all such combinations/permutations. For example, a system described as having three optional features may be embodied in seven different ways, namely with just one of the three possible features, with any two of the three possible features or with all three of the three possible features.

While various embodiments of the present invention have been disclosed and described in detail herein, it will be apparent to those skilled in the art that various changes may be made to the configuration, operation and form of the invention without departing from the spirit and scope thereof. In particular, it is noted that the respective features of the invention, even those disclosed solely in combination with other features of the invention, may be combined in any configuration excepting those readily apparent to the person skilled in the art as nonsensical. Likewise, use of the singular and plural is solely for the sake of illustration and is not to be interpreted as limiting. Except where the contrary is explicitly noted, the plural may be replaced by the singular and vice-versa.

The above disclosure may be summarized as comprising the following embodiments.

Embodiment 1

A vehicle, comprising:
a forward frame portion;
a rear frame portion;
a motion control system that movably interconnects said forward frame portion and said rear frame portion; and
a drivetrain comprising a drivetrain element, wherein
said motion control system is movable between a first end-of-range state and a second end-of-range state, and
a tensioning of said drivetrain element, regardless of an operating state of said motion control system, imparts a force onto said motion control system that urges said motion control system toward a third state that differs from said first end-of-range state and said second end-of-range state.

Embodiment 2

The vehicle of Embodiment 1, wherein:
a forward acceleration of said rear frame portion resulting from a driving force imparted by a wheel supported by said rear frame portion imparts a force onto said motion control system that urges said motion control system toward said second end-of-range state.

Embodiment 3

The vehicle of Embodiment 1 or 2, wherein:
an acceleration of a user mass supported by said forward frame portion imparts a force onto said motion control system that urges said motion control system toward said second end-of-range state.

Embodiment 4

The vehicle of any one of Embodiments 1-3, wherein:
in an operating state of said motion control system between said second end-of-range state and said third state, a tensioning of said drivetrain element imparts a force onto said motion control system that urges said motion control system toward said first end-of-range state.

Embodiment 5

The vehicle of any one of Embodiments 1-4, wherein:
in an operating state of said motion control system between said first end-of-range state and said third state, a tensioning of said drivetrain element imparts a force onto said motion control system that urges said motion control system toward said second end-of-range state.

Embodiment 6

The vehicle of any one of Embodiments 1-5, wherein:
said motion control system comprises a first motion control device that movably interconnects said forward frame portion and said rear frame portion and a second motion control device that movably interconnects said forward frame portion and said rear frame portion.

Embodiment 7

A vehicle, comprising:
a forward frame portion;
a rear frame portion;
a motion control system comprising a first motion control device that movably interconnects said forward frame portion and said rear frame portion and a second motion control device that movably interconnects said forward frame portion and said rear frame portion; and
a drivetrain comprising a drivetrain element, wherein
a tensioning of said drivetrain element imparts a first force onto said second motion control device, and
a force imparted onto said motion control system by an obstacle-avoiding motion of said rear frame portion imparts a second force onto said second motion control device that is no more than 45° from perpendicular to said first force.

Embodiment 8

The vehicle of Embodiment 7, wherein:
said second force is no more than 30° from perpendicular to said first force.

Embodiment 9

The vehicle of Embodiment 7 or 8, wherein:
said first force is a tensioning force that tensions said second motion control device between a first connection point to said first frame portion and a second connection point to said second frame portion, and
said second force is a pivoting force that pivots said second motion control device relative to at least one of said first connection point and said second connection point.

Embodiment 10

A vehicle, comprising:
a forward frame portion;
a rear frame portion; and
a mechanically self-stabilizing motion control system that movably interconnects said forward frame portion and said rear frame portion.

Embodiment 11

The vehicle of Embodiment 10, wherein:
said motion control system, by virtue of a geometric arrangement of said motion control system relative to said forward frame portion and said rear frame portion, adopts, in response to a forward acceleration of said rear frame portion resulting from a driving force imparted by a wheel supported by said rear frame portion, a self-stabilized operating state in which forces imparted onto said motion control system by
  a tensioning of a drivetrain element that transfers driving energy from a driving axle supported by said forward frame portion to a driven axle supported by said rear frame portion,
  said forward acceleration of said rear frame portion, and
  an acceleration of a user mass supported by said forward frame portion
are in equilibrium.

Embodiment 12

The vehicle of Embodiment 10 or 11, wherein:
said motion control system comprises a first motion control device that movably interconnects said forward frame portion and said rear frame portion and a second motion control device that movably interconnects said forward frame portion and said rear frame portion,
said motion control system is a 4-bar linkage, a portion of said forward frame portion constituting a first bar of said 4-bar linkage, said first motion control device constituting a second bar of said 4-bar linkage, a portion of said rear frame portion constituting a third bar of said 4-bar linkage, and said second motion control device constituting a fourth bar of said 4-bar linkage.

Embodiment 13

The vehicle of Embodiment 12, wherein:
a first end of said first motion control device is pivotally connected to said forward frame portion, a second end of said first motion control device is pivotally connected to said rear frame portion, a first end of said second motion control device is pivotally connected to said forward frame portion, and a second end of said second motion control device is pivotally connected to said rear frame portion.

Embodiment 14

The vehicle of any one of Embodiments 6-9, 12 and 13, wherein:
said first motion control device connects to said rear frame portion at a first location, and said second motion control device connects to said rear frame portion at a second location that is a fixed distance from said first location.

Embodiment 15

The vehicle of any one of Embodiments 1-9 and 14, wherein:
said drivetrain element transfers driving energy from a driving axle supported by said forward frame portion to a driven axle supported by said rear frame portion.

The invention claimed is:

1. A vehicle, comprising:
a forward frame portion;
a rear frame portion; and
a motion control system comprising a first motion control device that movably interconnects said forward frame portion and said rear frame portion and a second motion control device that movably interconnects said forward frame portion and said rear frame portion, wherein
said first motion control device connects to said rear frame portion at a first location, and said second motion control device connects to said rear frame portion at a second location that is a fixed distance from said first location, and
said motion control system, by virtue of a geometric arrangement of said motion control system relative to said forward frame portion and said rear frame portion, adopts, in response to a forward acceleration of said rear frame portion resulting from a driving force imparted by a wheel supported by said rear frame portion, an operating state in which forces imparted onto said motion control system by
  a tensioning of a drivetrain element that transfers driving energy from a driving axle supported by said forward frame portion to a driven axle supported by said rear frame portion,
  said forward acceleration of said rear frame portion, and
  an acceleration of a user mass supported by said forward frame portion are in equilibrium.

2. The vehicle of claim 1, wherein:
said operating state differs from an end-of-range state of said motion control system.

3. The vehicle of claim 1, wherein:
said first motion control device and said second motion control device collectively define a path of motion of said rear frame portion relative to said forward frame portion.

4. The vehicle of claim 1, wherein:
said motion control system, in response to said tensioning of said drivetrain element, imparts a force onto said rear frame portion that increases a force on said driven axle in a terrain direction.

5. The vehicle of claim 1, wherein:
said motion control system is free to move from said operating state in response to an obstacle-avoiding motion of said rear frame portion.

6. The vehicle of claim 1, wherein:
said forward frame portion comprises a seat support portion in an upper region of said forward frame portion and a drivetrain axle support in a lower region of said forward frame portion, and
said motion control system, in response to said forward acceleration of said rear frame portion, imparts a force onto said forward frame portion that accelerates said seat support portion in said forward direction at an acceleration no less than an acceleration of said drivetrain axle support in said forward direction.

7. The vehicle of claim 1, wherein:
said first motion control device comprises a sliding element.

8. The vehicle of claim 7, wherein:
said front frame portion comprises a tubular structure that extends from a lower region of said forward frame portion in a direction of a seat support portion of said forward frame portion, and
said sliding element slides along said tubular structure.

9. The vehicle of claim 8, wherein:
said tubular structure is a seat tube.

10. The vehicle of claim 7, wherein:
said sliding element is pivotally connected to said rear frame portion.

11. The vehicle of claim 1, wherein:
said first motion control device comprises a flexing element.

12. The vehicle of claim 1, wherein:
said motion control system movably interconnects said rear frame portion and said forward frame portion such that motion of said rear frame portion relative to said forward frame portion is restricted to substantially in-plane motion.

13. The vehicle of claim 1, wherein:
said second motion control device comprises at least one rigid link pivotally connected to said rear frame portion and said forward frame portion.

14. The vehicle of claim 1, wherein:
said second motion control device is pivotally connected to said rear frame portion at a location that is more distal to a support of said driven axle than a location at which first motion control device is connected to said rear frame portion.

15. The vehicle of claim 1, comprising:
an energy management system comprising at least one of a spring and a fluid-based shock absorber, wherein
said motion control system is distinct from said energy management system.

* * * * *